(12) United States Patent
Fitzpatrick et al.

(10) Patent No.: US 9,021,231 B2
(45) Date of Patent: Apr. 28, 2015

(54) STORAGE CONTROL SYSTEM WITH WRITE AMPLIFICATION CONTROL MECHANISM AND METHOD OF OPERATION THEREOF

(75) Inventors: James Fitzpatrick, Sudbury, MA (US); Bernardo Rub, Sudbury, MA (US); Mark Dancho, Chandler, AZ (US); James Higgins, Chandler, AZ (US); Ryan Jones, Mesa, AZ (US)

(73) Assignee: Smart Storage Systems, Inc., Chandler, AZ (US)

( * ) Notice: Subject to any disclaimer, the term of this patent is extended or adjusted under 35 U.S.C. 154(b) by 141 days.

(21) Appl. No.: 13/601,243

(22) Filed: Aug. 31, 2012

(65) Prior Publication Data

US 2013/0061019 A1    Mar. 7, 2013

Related U.S. Application Data

(60) Provisional application No. 61/530,918, filed on Sep. 2, 2011.

(51) Int. Cl.
*G06F 12/02* (2006.01)
*G06F 11/34* (2006.01)

(52) U.S. Cl.
CPC ........ *G06F 11/3409* (2013.01); *G06F 11/3485* (2013.01); *G06F 11/3442* (2013.01); *G06F 2201/88* (2013.01)

(58) Field of Classification Search
None
See application file for complete search history.

(56) References Cited

U.S. PATENT DOCUMENTS

| | | | |
|---|---|---|---|
| 4,048,481 | A | 9/1977 | Bailey, Jr. et al. |
| 5,034,744 | A | 7/1991 | Obinata |
| 5,311,395 | A | 5/1994 | McGaha et al. |
| 5,479,638 | A | 12/1995 | Assar et al. |
| 5,930,504 | A | 7/1999 | Gabel |
| 5,949,785 | A | 9/1999 | Beasley |
| 5,963,983 | A | 10/1999 | Sakakura et al. |
| 6,069,827 | A | 5/2000 | Sinclair |
| 6,091,652 | A | 7/2000 | Haehn et al. |
| 6,275,436 | B1 | 8/2001 | Tobita et al. |
| 6,345,367 | B1 | 2/2002 | Sinclair |
| 6,356,447 | B2 | 3/2002 | Scafidi |
| 6,381,670 | B1 | 4/2002 | Lee et al. |
| 6,412,080 | B1 | 6/2002 | Fleming et al. |
| 6,529,997 | B1 | 3/2003 | Debiez et al. |
| 6,552,581 | B1 | 4/2003 | Gabara |
| 6,587,915 | B1 | 7/2003 | Kim |

(Continued)

FOREIGN PATENT DOCUMENTS

| EP | 1 956 489 A2 | 8/2008 |
|---|---|---|
| EP | 1 990 921 A2 | 11/2008 |

(Continued)

OTHER PUBLICATIONS

Cooke, "Introduction to Flash Memory (T1A)," Flash Memory Summit Aug. 22. 2008, Micron Technology, Inc., 102 pages.

(Continued)

*Primary Examiner* — Duc Doan
(74) *Attorney, Agent, or Firm* — Morgan, Lewis & Bockius LLP

(57) ABSTRACT

A method of operation of a storage control system includes: partitioning logical addresses into a number of subdrives, the logical addresses associated with a memory device; and monitoring a data write measure of one of the subdrives.

20 Claims, 6 Drawing Sheets

(56) References Cited

U.S. PATENT DOCUMENTS

| | | |
|---|---|---|
| 6,618,249 B2 | 9/2003 | Fairchild |
| 6,661,503 B1 | 12/2003 | Yamaguchi et al. |
| 6,728,913 B1 | 4/2004 | Parker |
| 6,763,424 B2 | 7/2004 | Conley |
| 6,775,792 B2 | 8/2004 | Ulrich et al. |
| 6,778,387 B2 | 8/2004 | Fairchild |
| 6,850,443 B2 | 2/2005 | Lofgren et al. |
| 6,854,070 B2 | 2/2005 | Johnson et al. |
| 6,871,304 B2 | 3/2005 | Hadjihassan et al. |
| 6,903,972 B2 | 6/2005 | Lasser et al. |
| 6,906,961 B2 | 6/2005 | Eggleston et al. |
| 6,975,028 B1 | 12/2005 | Wayburn et al. |
| 7,082,495 B2 | 7/2006 | DeWhitt et al. |
| 7,107,389 B2 | 9/2006 | Inagaki et al. |
| 7,139,864 B2 | 11/2006 | Bennett et al. |
| 7,233,497 B2 | 6/2007 | Simon et al. |
| 7,243,186 B2 | 7/2007 | Liang et al. |
| 7,298,888 B2 | 11/2007 | Hamar |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,613,871 B2 | 11/2009 | Tanaka et al. |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,693,422 B2 | 4/2010 | Alicherry et al. |
| 7,738,502 B2 | 6/2010 | Chang et al. |
| 7,743,216 B2 | 6/2010 | Lubbers et al. |
| 7,818,525 B1 | 10/2010 | Frost et al. |
| 7,827,348 B2 | 11/2010 | Lee et al. |
| 7,830,164 B2 | 11/2010 | Earle et al. |
| 7,979,614 B1 | 7/2011 | Yang |
| 8,001,135 B2 | 8/2011 | Perlmutter et al. |
| 8,010,738 B1 | 8/2011 | Chilton et al. |
| 8,028,123 B2 | 9/2011 | Kilzer et al. |
| 8,046,645 B2 | 10/2011 | Hsu et al. |
| 8,051,241 B2 | 11/2011 | Feldman et al. |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 | 8/2012 | Olbrich et al. |
| 8,254,172 B1 | 8/2012 | Kan |
| 8,259,506 B1 | 9/2012 | Sommer et al. |
| 8,289,801 B2 | 10/2012 | Smith et al. |
| 8,296,534 B1 | 10/2012 | Gupta et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,386,860 B2 | 2/2013 | Tseng et al. |
| 8,407,409 B2 | 3/2013 | Kawaguchi |
| 8,464,106 B2 | 6/2013 | Filor et al. |
| 8,503,238 B1 | 8/2013 | Wu et al. |
| 8,612,804 B1 | 12/2013 | Kang et al. |
| 2002/0056025 A1 | 5/2002 | Qiu et al. |
| 2002/0159285 A1 | 10/2002 | Morley et al. |
| 2003/0033308 A1 | 2/2003 | Patel et al. |
| 2003/0046603 A1 | 3/2003 | Harari et al. |
| 2003/0074592 A1 | 4/2003 | Hasegawa |
| 2003/0163633 A1 | 8/2003 | Aasheim et al. |
| 2004/0080985 A1 | 4/2004 | Chang et al. |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0073884 A1 | 4/2005 | Gonzalez et al. |
| 2006/0015683 A1 | 1/2006 | Ashmore et al. |
| 2006/0020745 A1 | 1/2006 | Conley et al. |
| 2006/0136682 A1 | 6/2006 | Haridas et al. |
| 2006/0143365 A1 | 6/2006 | Kikuchi |
| 2006/0253641 A1 | 11/2006 | Gatzemeier et al. |
| 2006/0256624 A1 | 11/2006 | Eggleston et al. |
| 2006/0282644 A1 | 12/2006 | Wong |
| 2006/0294574 A1 | 12/2006 | Cha |
| 2007/0050536 A1 | 3/2007 | Kolokowsky |
| 2007/0061511 A1 | 3/2007 | Faber |
| 2007/0083779 A1 | 4/2007 | Misaka et al. |
| 2007/0234004 A1 | 10/2007 | Oshima et al. |
| 2007/0260811 A1 | 11/2007 | Merry, Jr. et al. |
| 2007/0263444 A1 | 11/2007 | Gorobets et al. |
| 2007/0276973 A1 | 11/2007 | Tan et al. |
| 2008/0046630 A1 | 2/2008 | Lasser |
| 2008/0052446 A1 | 2/2008 | Lasser et al. |
| 2008/0082736 A1 | 4/2008 | Chow et al. |
| 2008/0183918 A1 | 7/2008 | Dhokia et al. |
| 2008/0313505 A1 | 12/2008 | Lee et al. |
| 2009/0019321 A1 | 1/2009 | Radke |
| 2009/0083587 A1 | 3/2009 | Ng et al. |
| 2009/0089485 A1 | 4/2009 | Yeh |
| 2009/0125670 A1 | 5/2009 | Keays |
| 2009/0138654 A1 | 5/2009 | Sutardja |
| 2009/0146721 A1 | 6/2009 | Kurooka et al. |
| 2009/0157948 A1 | 6/2009 | Trichina et al. |
| 2009/0164702 A1 | 6/2009 | Kern |
| 2009/0172262 A1 | 7/2009 | Olbrich et al. |
| 2009/0228761 A1 | 9/2009 | Perlmutter et al. |
| 2009/0259819 A1 | 10/2009 | Chen et al. |
| 2009/0259896 A1 | 10/2009 | Hsu et al. |
| 2009/0323419 A1 | 12/2009 | Lee et al. |
| 2009/0327581 A1 | 12/2009 | Coulson |
| 2009/0327591 A1 | 12/2009 | Moshayedi |
| 2010/0017650 A1 | 1/2010 | Chin et al. |
| 2010/0023674 A1 | 1/2010 | Aviles |
| 2010/0050053 A1 | 2/2010 | Wilson et al. |
| 2010/0128537 A1 | 5/2010 | Suhail et al. |
| 2010/0138592 A1 | 6/2010 | Cheon |
| 2010/0169541 A1 | 7/2010 | Freikorn |
| 2010/0174845 A1 | 7/2010 | Gorobets et al. |
| 2010/0217898 A1 | 8/2010 | Priborsky et al. |
| 2010/0217915 A1 | 8/2010 | O'Connor et al. |
| 2010/0228928 A1 | 9/2010 | Asnaashari et al. |
| 2010/0262792 A1 | 10/2010 | Hetzler et al. |
| 2010/0262795 A1 | 10/2010 | Hetzler et al. |
| 2010/0262875 A1 | 10/2010 | Hetzler et al. |
| 2010/0287328 A1 | 11/2010 | Feldman et al. |
| 2010/0293367 A1 | 11/2010 | Berke et al. |
| 2010/0312954 A1 | 12/2010 | Jeon et al. |
| 2010/0318719 A1 | 12/2010 | Keays et al. |
| 2010/0332726 A1 | 12/2010 | Wang |
| 2011/0055468 A1 | 3/2011 | Gonzalez et al. |
| 2011/0066788 A1 | 3/2011 | Eleftheriou et al. |
| 2011/0099342 A1 | 4/2011 | Ozdemir |
| 2011/0131365 A1 | 6/2011 | Zhang et al. |
| 2011/0131447 A1 | 6/2011 | Prakash et al. |
| 2011/0145473 A1 | 6/2011 | Maheshwari |
| 2011/0161775 A1 | 6/2011 | Weingarten |
| 2011/0190963 A1 | 8/2011 | Glassl et al. |
| 2011/0191522 A1 | 8/2011 | Condict et al. |
| 2011/0191649 A1 | 8/2011 | Lim et al. |
| 2011/0209032 A1 | 8/2011 | Choi et al. |
| 2011/0238892 A1 | 9/2011 | Tsai et al. |
| 2011/0239088 A1 | 9/2011 | Post |
| 2011/0314219 A1 | 12/2011 | Ulrich et al. |
| 2011/0320687 A1 | 12/2011 | Belluomini et al. |
| 2012/0008401 A1 | 1/2012 | Katz et al. |
| 2012/0011336 A1 | 1/2012 | Saika |
| 2012/0047320 A1 | 2/2012 | Yoo et al. |
| 2012/0047409 A1 | 2/2012 | Post et al. |
| 2012/0066450 A1 | 3/2012 | Yochai et al. |
| 2012/0124046 A1 | 5/2012 | Provenzano |
| 2012/0124273 A1 | 5/2012 | Goss et al. |
| 2012/0151260 A1 | 6/2012 | Zimmermann et al. |

(56) References Cited

U.S. PATENT DOCUMENTS

| | | | |
|---|---|---|---|
| 2012/0213004 | A1 | 8/2012 | Yun et al. |
| 2012/0216085 | A1 | 8/2012 | Weingarten et al. |
| 2012/0236656 | A1 | 9/2012 | Cometti |
| 2012/0239858 | A1 | 9/2012 | Melik-Martirosian |
| 2012/0266048 | A1 | 10/2012 | Chung et al. |
| 2012/0324191 | A1 | 12/2012 | Strange et al. |
| 2012/0331207 | A1 | 12/2012 | Lassa et al. |
| 2013/0007380 | A1 | 1/2013 | Seekins et al. |
| 2013/0007543 | A1 | 1/2013 | Goss et al. |
| 2013/0054881 | A1 | 2/2013 | Ellis et al. |
| 2013/0060994 | A1 | 3/2013 | Higgins et al. |
| 2013/0073788 | A1 | 3/2013 | Post et al. |
| 2013/0080691 | A1 | 3/2013 | Weingarten et al. |
| 2013/0094289 | A1 | 4/2013 | Sridharan et al. |
| 2013/0100600 | A1 | 4/2013 | Yin et al. |
| 2013/0124792 | A1 | 5/2013 | Melik-Martirosian et al. |
| 2013/0151753 | A1 | 6/2013 | Jeon et al. |
| 2013/0238833 | A1 | 9/2013 | Vogan et al. |
| 2013/0265825 | A1 | 10/2013 | Lassa |
| 2014/0108891 | A1 | 4/2014 | Strasser et al. |
| 2014/0129874 | A1 | 5/2014 | Zaltsman et al. |
| 2014/0208174 | A1 | 7/2014 | Ellis et al. |

FOREIGN PATENT DOCUMENTS

| | | | |
|---|---|---|---|
| JP | 2012129859 | A | 7/2012 |
| WO | WO 2009/042298 | A1 | 4/2009 |
| WO | WO 2011/156466 | A2 | 4/2009 |

OTHER PUBLICATIONS

Gal et al., "Algorithms and Data Structures for Flash Memories," ACM Computing Surveys, Jun. 2005, vol. 37, No. 2, 30 pages.

IBM Corporation "Systems Management, Work Management," Version 5, Release 4, 9th Editon, Feb. 2006, pp. 1-21.

O'Brien, "SMART Storage Systems Optimus SAS Enterprise SSD Review," SMART Storage Systems, Oct. 9, 2012, 44 pages.

Spanjer, "Flash Management—Why and How?" Smart Modular Technologies, Nov. 2009, http://www.scantec.de/fileadmin/pdf/Smart_Modular/Flash-Management.pdf, 14 pages.

Texas Instruments, "Power Management IC for Digital Set Top Boxes," SLVSA10A, Sep. 2009, pp. 1-22.

International Search Report and Written Opinion dated Dec. 20, 2013, received in PCT/US2013/045282, which corresponds to U.S. Appl. No. 13/493,949, 7 pages (Ellis).

Ulinktech, "ATA Command Table (in Alphabetic Order)," Feb. 6, 2011. https://web.archive.org/web/20110206060820/http://www.ulinktech.com/downloads/AT, 6 pages.

International Search Report and Written Opinion dated Nov. 7, 2014, received in International Patent Application No. PCT/US2014/049732, which corresponds to U.S. Appl. No. 14/384,350, 13 pages. (Fitzpatrick).

International Search Report and Written Opinion dated Oct. 17, 2014, received in International Patent Application No. PCT/US2014/049734, which corresponds to U.S. Appl. No. 14/332,259, 8 pages (Higgins).

International Search Report and Written Opinion dated Oct. 23, 2014, received in International Patent Application No. PCT/US2014/049736, which corresponds to U.S. Appl. No. 14/446,249 8 pages (Fitzpatrick).

International Search Report and Written Opinion dated May 14, 2014, received in International Patent Application No. PCT/US2014/017168, which corresponds to U.S. Appl. No. 14/076,115, 6 pages (Fitzpatrick)

International Search Report and Written Opinion dated May 14, 2014, received in International Patent Application No. PCT/US2014/017169, which corresponds to U.S. Appl. No. 14/076,148, 6 pages (Fitzpatrick).

International Search Report and Written Opinion dated Aug. 22, 2014, received in International Patent Application No. PCT/US2014/032978, which corresponds to U.S. Appl. No. 14/081,992, 10 pages (Ellis).

International Search Report dated Mar. 25, 2014, received in International Patent Application No. PCT/US2013/072400, which corresponds to U.S. Appl. No. 13/690,337, 3 pages (Ellis).

International Search Report and Written Opinion dated Jun. 12, 2014, received in PCT/US2014/018972, which corresponds to U.S. Appl. No. 13/779,352, 12 pages (Schmier).

International Search Report and Written Opinion dated Jul. 31, 2014, received in International Patent Application No. PCT/US2014/031465, which corresponds to U.S. Appl. No. 13/851,928, 13 pages (Ellis).

International Search Report and Written Opinion dated Nov. 5, 2014, received in International Patent Application No. PCT/US2014/049282, which corresponds to U.S. Appl. No. 13/957,407, 12 pages (Fitzpatrick).

International Search Report and Written Opinion dated Jul. 31, 2014, received in International Patent Application No. PCT/US2014/033876, which corresponds to U.S. Appl. No. 13/861,326, 9 pages (Fitzpatrick).

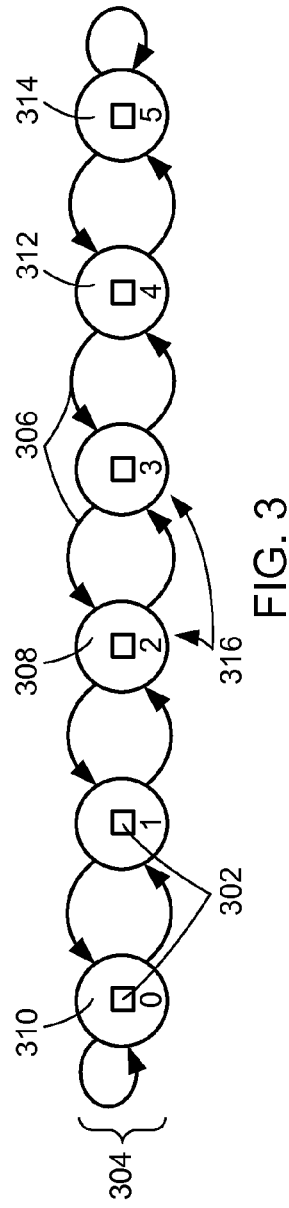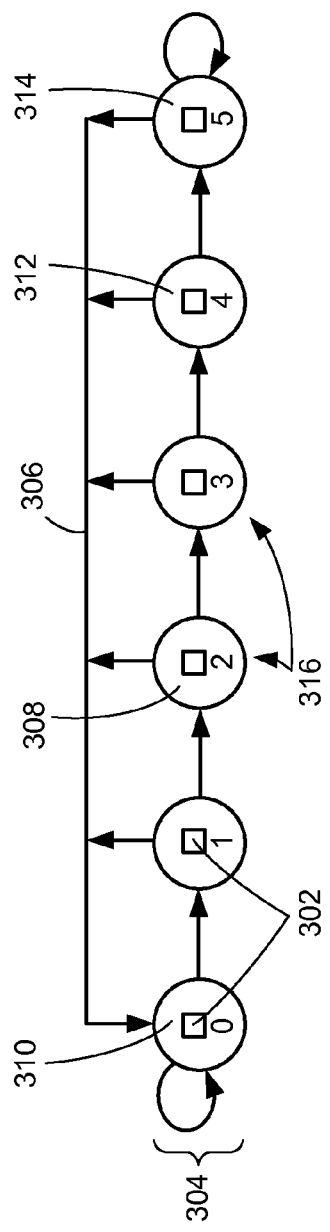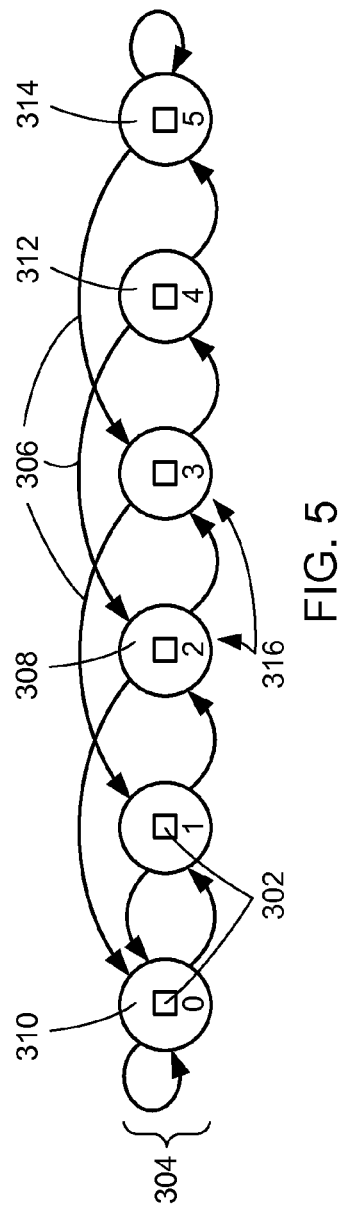

STORAGE CONTROL SYSTEM WITH WRITE AMPLIFICATION CONTROL MECHANISM AND METHOD OF OPERATION THEREOF

CROSS-REFERENCE TO RELATED APPLICATION

This application claims the benefit of U.S. Provisional Patent Application Ser. No. 61/530,918 filed Sep. 2, 2011, and the subject matter thereof is incorporated herein by reference thereto.

TECHNICAL FIELD

The present invention relates generally to a storage control system and more particularly to a system for write amplification control.

BACKGROUND ART

Data storage, often called storage or memory, refers to computer components and recording media that retain digital data. Data storage is a core function and fundamental component of consumer and industrial electronics, especially devices such as computers, televisions, cellular phones, mobile devices, and digital video cameras.

An information system is generally equipped with a data storage system using a hard disk drive (HDD) as a storage device. The data storage system is accessed from a plurality of higher-level devices (for example, hosts) via a storage area network (SAN). Storage control in the data storage system can be implemented according to a RAID (Redundant Array of Independent (or Inexpensive)) technology. As a result, a highly reliable information system can be realized.

The data storage system can include a flash memory that is installed instead of or in addition to an HDD and data that will be read out or written into a higher-level device are stored in the flash memory. It can be anticipated that the data storage system having the same storage capacity as a storage system based on HDD will be realized by providing a large number of flash memories. As the capacity and a number of the flash memories increase, data stored in the flash memories must be properly managed to order to improve reliability of the data storage system.

Thus, a need still remains for better data management. In view of the increasing demand for improved data management, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a storage control system, including: partitioning logical addresses into a number of subdrives, the logical addresses associated with a memory device; and monitoring a data write measure of one of the subdrives.

The present invention provides a storage control system, including: a subdrive assignment module for partitioning logical addresses into a number of subdrives, the logical addresses associated with a memory device; and a data monitor module, coupled to the subdrive assignment module, for monitoring a data write measure of one of the subdrives.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 3 is a first exemplary state diagram of the memory controller of FIG. 1.

FIG. 4 is a second exemplary state diagram of the memory controller of FIG. 1.

FIG. 5 is a third exemplary state diagram of the memory controller of FIG. 1.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

NOT-AND (NAND) flash can be used for a finite number of program and erase cycles. Solid-state disk drives map requests for data in specified logical addresses to be written into physical addresses so that the entire physical address range of the flash is used. By using the entire physical address range, wearing out one portion of the flash sooner than another and thus ending the useful life of a SSD prematurely can be avoided.

An approach to recycling blocks of the SSD is called the "Greedy" algorithm. The Greedy algorithm can select the block with the most number of obsolete pages to recycle. When write workloads are uniform across the entire address space, the write amplification (WA) can be determined analytically. When some regions of the entire address space have a higher concentration of write accesses and other portions have a lower portion of the write accesses, the Greedy algorithm can have very large write amplification (WA) compared to uniform random workloads. A key concept is that the WA for uniform workloads should be the worst case. It is a failing of the Greedy algorithm that the WA can be higher for non-uniform workloads. The present invention provides a mechanism to recycle data that minimizes the write amplification (WA) for a variety of workloads.

Figure 1:
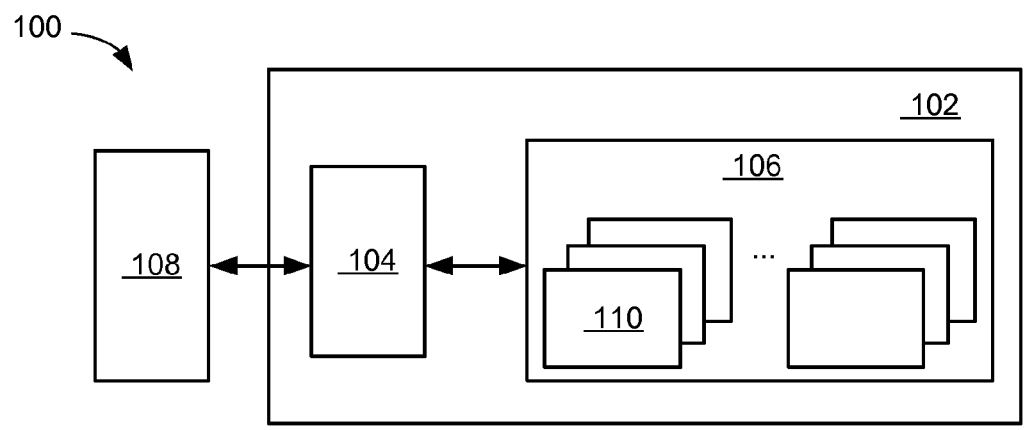
FIG. 1 is a storage control system with write amplification control mechanism in an embodiment of the present invention.

Referring now to FIG. 1, therein is shown a storage control system 100 with write amplification control mechanism in an embodiment of the present invention. The storage control system 100 can include a memory sub-system 102 having a memory controller 104 and a memory array 106. The memory sub-system 102 can include a solid-state disk drive (SSD). The storage control system 100 can include a host system 108 communicating with the memory sub-system 102.

The memory controller 104 provides data control and management of the memory array 106. The memory controller 104 interfaces with the host system 108 and controls the memory array 106 to transfer data between the host system 108 and the memory array 106.

The memory array 106 can include an array of memory devices 110. The memory array 106 can include pages of data or information. The host system 108 can request the memory controller 104 for reading, writing, and deleting data from or to a logical address space of a storage device including the memory array 106.

For example, the memory devices 110 can represent a non-volatile memory including a flash memory device or a reprogrammable storage device. As a specific example, the memory devices 110 can represent a non-volatile memory including a NAND type device, a flash memory, and a multi-level cell (MLC) memory.

Figure 2:
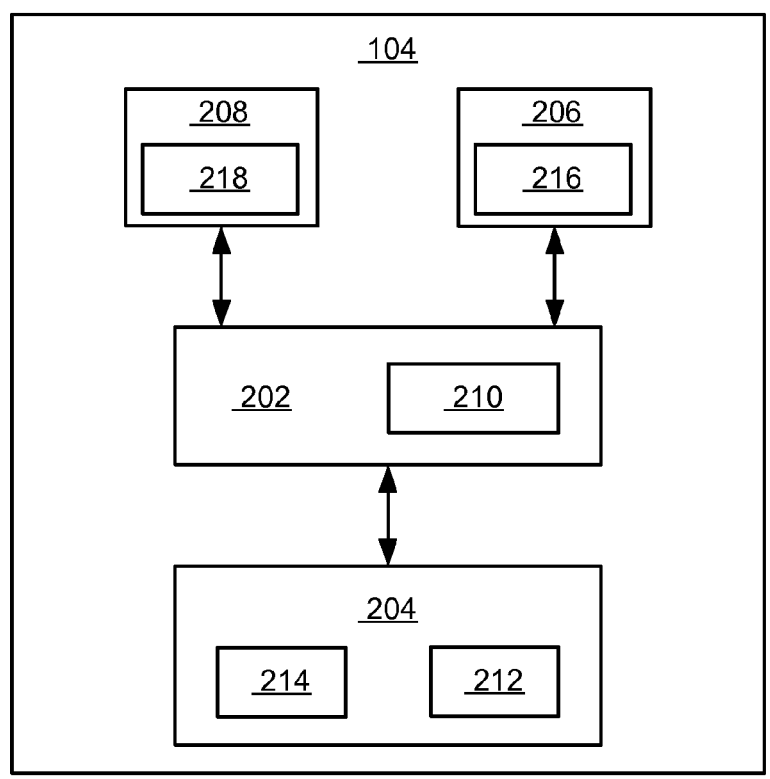
FIG. 2 is an exemplary hardware block diagram of the memory controller.

Referring now to FIG. 2, therein is shown an exemplary hardware block diagram of the memory controller 104. The memory controller 104 can include a control unit 202, a storage unit 204, a memory interface unit 206, and a host interface unit 208. The control unit 202 can include a control interface 210. The control unit 202 can execute software 212 stored in the storage unit 204 to provide the intelligence of the memory controller 104.

The control unit 202 can be implemented in a number of different manners. For example, the control unit 202 can be a processor, an embedded processor, a microprocessor, a hardware control logic, a hardware finite state machine (FSM), a digital signal processor (DSP), or a combination thereof.

The control interface 210 can be used for communication between the control unit 202 and other functional units in the memory controller 104. The control interface 210 can also be used for communication that is external to the memory controller 104.

The control interface 210 can receive information from the other functional units or from external sources, or can transmit information to the other functional units or to external destinations. The external sources and the external destinations refer to sources and destinations external to the memory controller 104.

The control interface 210 can be implemented in different ways and can include different implementations depending on which functional units or external units are being interfaced with the control interface 210. For example, the control interface 210 can be implemented with dedicated hardware including an application-specific integrated circuit (ASIC), configurable hardware including a Field programmable Gate Array (FPGA), a discrete electronic hardware, or a combination thereof.

The storage unit 204 can include hardware for storing the software 212 including control firmware. The storage unit 204 can include a volatile memory, a nonvolatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM).

The storage unit 204 can include a storage interface 214. The storage interface 214 can also be used for communication that is external to the memory controller 104. The storage interface 214 can receive information from the other functional units or from external sources, or can transmit information to the other functional units or to external destinations. The external sources and the external destinations refer to sources and destinations external to the memory controller 104.

The storage interface 214 can include different implementations depending on which functional units or external units are being interfaced with the storage unit 204. The storage interface 214 can be implemented with technologies and techniques similar to the implementation of the control interface 210.

The memory interface unit 206 can enable external communication to and from the memory controller 104. For example, the memory interface unit 206 can permit the memory controller 104 to communicate with the memory array 106 of FIG. 1.

The memory interface unit 206 can include a memory interface 216. The memory interface 216 can be used for communication between the memory interface unit 206 and other functional units in the memory controller 104. The memory interface 216 can receive information from the other functional units or can transmit information to the other functional units.

The memory interface 216 can include different implementations depending on which functional units are being interfaced with the memory interface unit 206. The memory interface 216 can be implemented with technologies and techniques similar to the implementation of the control interface 210.

The host interface unit 208 allows the host system 108 of FIG. 1 to interface and interact with the memory controller 104. The host interface unit 208 can include a host interface 218 to provide communication mechanism between the host interface unit 208 and the host system 108.

The control unit 202 can operate the host interface unit 208 to send control or status information generated by the memory controller 104 to the host system 108. The control unit 202 can also execute the software 212 for the other functions of the memory controller 104. The control unit 202 can further execute the software 212 for interaction with the memory array 106 via the memory interface unit 206.

The functional units in the memory controller 104 can work individually and independently of the other functional units. For illustrative purposes, the memory controller 104 is described by operation of the memory controller 104 with the host system 108 and the memory array 106. It is understood that the memory controller 104, the host system 108, and the memory array 106 can operate any of the modules and functions of the memory controller 104.

Referring now to FIG. 3, therein is shown a first exemplary state diagram of the memory controller 104 of FIG. 1. The first exemplary state diagram depicts how logical addresses 302 can migrate among subdrives 304. The first exemplary state diagram also depicts migration of the logical addresses 302 from one of the subdrives 304 to another of the subdrives 304 depending upon whether the logical addresses 302 are written by the host system 108 of FIG. 1 or recycled.

The logical addresses 302 are defined as addresses assigned to sectors in a non-volatile memory for data access. The logical addresses 302 can be associated with the memory devices 110 of FIG. 1. For example, the logical addresses 302 can represent logical block addresses (LBAs). The logical addresses 302, shown by the squares, can be associated with any of the subdrives 304.

The subdrives 304 are defined as groups or partitions of portions of a logical address space that have similar rates or approximately the same rate of accesses for logical addresses within each of the subdrives 304. The subdrives 304 are not disk drive volumes or logical drives that are known to the host system 108 because the subdrives 304 are accessible, controlled, or known only to the memory controller 104 but not to the host system 108. A rate of the accesses is defined as a fraction of all writes to a particular logical address (or a range of logical addresses). The rate of the accesses can be expressed as a number of data write accesses 306 over all writes. The numbers of the data write accesses 306 in each of the subdrives 304 can be within a range of numerical values. For example, the subdrives 304 can represent groups or partitions of portions of a logical address space that have similar temperatures. The term "temperature" refers to a number of the data write accesses 306 over a total number of the data write accesses 306 or a range of the logical addresses. The data write accesses 306 are defined as transactions for writing data to the memory devices 110. For example, the data write accesses 306 can represent host write transactions.

For most workloads to a solid-state disk drive, some portions of the logical address space get more of the data write accesses 306 than other portions of the logical address space. Regions or portions that get a greater proportion of the data write accesses 306 are considered "hot" while those regions or portions that get disproportionately few of the data write accesses 306 are considered "cold". Address ranges of the logical address space that get none of the data write accesses 306 are labeled as static. In the memory controller 104, data of similar temperatures are organized into a partition or one of the subdrives 304.

The first exemplary state diagram depicts a state diagram in which each state represents each of the subdrives 304. For example, each of the subdrives 304 can represent a different thermal partition. The first exemplary state diagram also depicts edges or transitions of the states to indicate how the logical addresses 302 migrate from one of the subdrives 304 to another of the subdrives 304 or to the same instance of the subdrives 304. The edges or the transitions occur because of writing the memory devices 110. The writing of the memory devices 110 can originate from the host system 108. The writing of the memory devices 110 can also originate from the memory controller 104 as the memory controller 104 performs garbage collection.

The data write accesses 306 from the host system 108 can cause the logical addresses 302 to be moved from one of the subdrives 304 to a more-written subdrive 308 or remained in a most-written subdrive 310. The logical addresses 302 can be recycled. When the logical addresses 302 are recycled, the logical addresses 302 can be moved from one of the subdrives 304 to a less-written subdrive 312 or remained in a least-written subdrive 314.

The more-written subdrive 308 is defined as one of the subdrives 304 that gets a greater proportion of the data write accesses 306 compared to another of the subdrives 304 from which the logical addresses 302 are moved. The most-written subdrive 310 is defined as one of the subdrives 304 that gets the highest proportion of the data write accesses 306 over the total number of the data accesses. One of the subdrives 304 can be the most-written subdrive 310, designated as subdrive 0. For example, the more-written subdrive 308 and the most-written subdrive 310 can represent a hotter subdrive and a hottest subdrive, respectively.

The less-written subdrive 312 is defined as one of the subdrives 304 that gets disproportionately fewer of the data write accesses 306 compared to another of the subdrives 304 to which the logical addresses 302 are moved. The least-written subdrive 314 is defined as one of the subdrives 304 that gets the lowest proportion of the data write accesses 306 over the total number of the data accesses. One of the subdrives 304 can be the least-written subdrive 314, designated as subdrive 5. For example, the less-written subdrive 312 and the least-written subdrive 314 can represent a colder subdrive and a coldest subdrive, respectively.

For illustrative purposes, the first exemplary state diagram is shown with 6 of the subdrives 304 due to an optimal theoretical tradeoff between write amplification (WA) efficiency and overhead, although it is understood that there can be any number of the subdrives 304. The subdrives 304 are designated with the states designated from 0 to 5 for the subdrive 0 to the subdrive 5, respectively.

The less-written subdrive 312 can represent the next colder subdrive. For illustrative purposes, the first exemplary state diagram depicts the less-written subdrive 312 as the subdrive 4 as the next colder subdrive from the subdrive 3, although it is understood that the less-written subdrive 312 can represent any of the subdrives 304 that is shown to the right of another of the subdrives 304. For example, the less-written subdrive 312 can represent one of subdrives 1 to 5 having fewer of the data write accesses 306 than one of subdrives 0 to 4, respectively.

The more-written subdrive 308 can represent the next hotter subdrive. For illustrative purposes, the first exemplary state diagram depicts the more-written subdrive 308 as the subdrive 2 as the next hotter subdrive from the subdrive 3, although it is understood that the more-written subdrive 308 can represent any of the subdrives 304 that is shown to the left of another of the subdrives 304. For example, the more-written subdrive 308 can represent one of subdrives 0 to 4 having more of the data write accesses 306 than one of subdrives 1 to 5, respectively.

A number of the subdrives 304 can be intermediate subdrives 316, designated as subdrives 1 to 4. The intermediate subdrives 316 are defined as the subdrives 304 that have temperatures that are greater than that of the least-written subdrive 314 and less than that of the most-written subdrive 310.

The most-written subdrive 310, designated as the subdrive 0, can include hottest logical addresses. The least-written subdrive 314, designated as the subdrive 5, can include coldest logical addresses. Because there is no complex algorithm used for controlling the assignment of the logical addresses 302 from one of the subdrives 304 to another of the subdrives 304, an increase in efficiency and a decrease in power usage can be achieved.

The logical addresses 302 can be passively assigned to the subdrives 304. The logical addresses 302 can be assigned towards the most-written subdrive 310. In other words, the logical addresses 302 from one of the subdrives 304 can be assigned from another of the subdrives 304 that is closer to the most-written subdrive 310 than the one of the subdrives 304. Furthermore, the logical addresses 302 from the most-written subdrive 310 can be reassigned to the most-written subdrive 310.

The logical addresses 302 can be assigned to the more-written subdrive 308 or remain in the most-written subdrive 310 when the data write accesses 306 occur. Furthermore, the logical addresses 302 can be assigned to the less-written subdrive 312 or remain in the least-written subdrive 314 when the logical addresses 302 that are not written are recycled.

When the data write accesses 306 occur, the logical addresses 302 can be moved from one of the subdrives 304 to the more-written subdrive 308. When the data write accesses 306 occur, the logical addresses 302 in the most-written subdrive 310 can remain in the most-written subdrive 310. For example, the logical addresses 302 can be moved from the least-written subdrive 314 to one of the intermediate subdrives 316, from one of the intermediate subdrives 316 to another of the intermediate subdrives 316, from one of the intermediate subdrives 316 to the most-written subdrive 310, or remain in the most-written subdrive 310.

The logical addresses 302 in the subdrives 304 can be moved from one of the subdrives 304 to the less-written subdrive 312 whenever the logical addresses 302 that are not written by the host system 108 are recycled. The logical addresses 302 in the least-written subdrive 314 can remain in the least-written subdrive 314. For example, the logical addresses 302 can be moved from the most-written subdrive 310 to one of the intermediate subdrives 316, from one of the intermediate subdrives 316 to another of the intermediate subdrives 316, from one of the intermediate subdrives 316 to the least-written subdrive 314, or remain in the least-written subdrive 314.

Whenever the logical addresses 302 are written by the host system 108, there can be an indication that data or the logical addresses 302 are increasing in temperature, or equivalently, increasing in likelihood of being written again. So, the logical addresses 302 can be moved to the more-written subdrive 308 as the next hotter subdrive. Since cold data is not written by the host system 108 very often, the cold data or the logical addresses 302 can be moved to the less-written subdrive 312, as they are recycled. Conversely, the logical addresses 302 that are written frequently, can bubble up or subsequently transition to the most-written subdrive 310.

The logical addresses 302 can be recycled to reclaim the logical addresses 302 that are older or written a longer time in the past. Data in the logical addresses 302 that are reclaimed can be moved or written to a new logical address for retention purposes.

A size of each of the subdrives 304 can be determined by workloads in the solid-state disk drive. For example, if 10% of the logical address space gets 90% of the data write accesses 306, the most-written subdrive 310 can include approximately 10% of the total logical content. Furthermore, there can be an extra physical space or memory added to provide over provisioning to manage the write amplification (WA). For example, because hot data is written more often than cold data, the extra physical space or memory for the hot data can allow less write amplification because the hot data can be recycled less often.

It has been discovered that an intelligent assignment of an appropriate amount of physical memory to each of the subdrives 304 and classifying them as the more-written subdrive 308 or the less-written subdrive 312 based on how often data is written to the subdrives 304 significantly minimizes the write amplification across the entire solid-state drive (SSD). The write amplification across the entire SSD is significantly minimized by providing more or less of the physical memory in the memory devices 110 for the more-written subdrive 308 or the less-written subdrive 312, respectively, resulting in proper sizing of the physical memory to each of the subdrives 304, which is the most important aspect of the memory controller 104.

It has also been discovered that assignment of the logical addresses 302 to the subdrives 304 done passively rather than actively reduces processing power and increases overall efficiency. The logical addresses 302 are assigned passively by being assigned towards the most-written subdrive 310, to the more-written subdrive 308, or remained in the most-written subdrive 310 when the data write accesses 306 to the logical addresses 302 occur. The logical addresses 302 are also assigned passively by being assigned to the less-written subdrive 312 or remained in the least-written subdrive 314 when the logical addresses 302 that are not written are recycled.

Referring now to FIG. 4, therein is shown a second exemplary state diagram of the memory controller 104 of FIG. 1. The second exemplary state diagram depicts how the logical addresses 302 can migrate among the subdrives 304. The second exemplary state diagram also depicts migration of the logical addresses 302 from one of the subdrives 304 to another of the subdrives 304 depending upon whether the logical addresses 302 are written by the host system 108 of FIG. 1 or recycled.

All of the data write accesses 306 from the host system 108 can cause the logical addresses 302 to be moved to or remained in the most-written subdrive 310. The logical addresses 302 can be recycled. When the logical addresses 302 are recycled, the logical addresses 302 can be moved from one of the subdrives 304 to the less-written subdrive 312 or remained in the least-written subdrive 314. For illustrative purposes, the second exemplary state diagram is shown with 6 of the subdrives 304 due to an optimal theoretical tradeoff between write amplification (WA) efficiency and overhead, although it is understood that there can be any number of the subdrives 304.

When the data write accesses 306 occur, the logical addresses 302 can be moved from one of the subdrives 304 to the most-written subdrive 310. When the data write accesses 306 occur, the logical addresses 302 in the most-written subdrive 310 can remain in the most-written subdrive 310. For example, the logical addresses 302 can be moved from the least-written subdrive 314 to the most-written subdrive 310, from one of the intermediate subdrives 316 to the most-written subdrive 310, or remain in the most-written subdrive 310.

The logical addresses 302 in the subdrives 304 can be moved from one of the subdrives 304 to the less-written subdrive 312 whenever the logical addresses 302 that are not written by the host system 108 are recycled. The logical addresses 302 in the least-written subdrive 314 can remain in the least-written subdrive 314. For example, the logical addresses 302 can be moved from the most-written subdrive 310 to one of the intermediate subdrives 316, from one of the intermediate subdrives 316 to another of the intermediate subdrives 316, from one of the intermediate subdrives 316 to the least-written subdrive 314, or remain in the least-written subdrive 314.

The second exemplary state diagram can be suboptimal compared to the first exemplary state diagram from write amplification perspective but is simplified in portions of a drive design. The second exemplary state diagram can be preferable over the first exemplary state diagram for some controller architectures.

It has been discovered that creating the subdrives 304 and classifying them as the more-written subdrive 308 or the less-written subdrive 312 based on how often data is written to the subdrives 304 significantly minimizes the write amplification across the entire solid-state drive (SSD).

It has also been discovered that the logical addresses 302 moved to the most-written subdrive 310 for the data write accesses 306 and moved from one of the subdrives 304 to the less-written subdrive 312 for recycling the logical addresses 302 provides improved performance with reduced logic and thus less resource utilization.

Referring now to FIG. 5, therein is shown a third exemplary state diagram of the memory controller 104 of FIG. 1. The third exemplary state diagram depicts how the logical addresses 302 can migrate among the subdrives 304. The third exemplary state diagram also depicts migration of the logical addresses 302 from one of the subdrives 304 to another of the subdrives 304 depending upon whether the logical addresses 302 are written by the host system 108 of FIG. 1 or recycled.

The data write accesses 306 from the host system 108 can cause the logical addresses 302 to be moved to the more-written subdrive 308. The logical addresses 302 can be recycled. When the logical addresses 302 are recycled, the logical addresses 302 can be moved from one of the subdrives 304 to the less-written subdrive 312 or remained in the least-written subdrive 314. For illustrative purposes, the third exemplary state diagram is shown with 6 of the subdrives 304 due to an optimal theoretical tradeoff between write amplification (WA) efficiency and overhead, although it is understood that there can be any number of the subdrives 304.

For illustrative purposes, the third exemplary state diagram depicts the more-written subdrive 308 as the next 2 of the subdrives 304, although it is understood that the more-written subdrive 308 can be any of the subdrives 304 that is hotter than one of the subdrives 304 from which the logical addresses 302 are moved. For example, the more-written subdrive 308 can be the most-written subdrive 310 or one of the intermediate subdrives 316 that is hotter than one of the subdrives 304 from which the logical addresses 302 are moved.

When the data write accesses 306 occur, the logical addresses 302 can be moved from one of the subdrives 304 to the more-written subdrive 308 that is hotter than the one of the subdrives 304. When the data write accesses 306 occur, the logical addresses 302 in the most-written subdrive 310 can remain in the most-written subdrive 310. For example, the logical addresses 302 can be moved from the least-written subdrive 314 to one of the intermediate subdrives 316, from one of the intermediate subdrives 316 to another of the intermediate subdrives 316, from one of the intermediate subdrives 316 to the most-written subdrive 310, or remain in the most-written subdrive 310.

The logical addresses 302 in the subdrives 304 can be moved from one of the subdrives 304 to the less-written subdrive 312 whenever the logical addresses 302 that are not written by the host system 108 are recycled. The logical addresses 302 in the least-written subdrive 314 can remain in the least-written subdrive 314. For example, the logical addresses 302 can be moved from the most-written subdrive 310 to one of the intermediate subdrives 316, from one of the intermediate subdrives 316 to another of the intermediate subdrives 316, from one of the intermediate subdrives 316 to the least-written subdrive 314, or remain in the least-written subdrive 314.

It has been discovered that the intelligent assignment of the appropriate amount of the physical memory to each of the subdrives 304 and the logical addresses 302 assigned to the subdrives 304 significantly minimizes the write amplification across the entire solid-state drive (SSD). The logical addresses 302 are assigned to the subdrives 304 by being assigned to the most-written subdrive 310 or one of the intermediate subdrives 316 that is hotter than one of the subdrives 304 from which the logical addresses 302 are moved. The logical addresses 302 are also assigned to the least-written subdrive 314 or the less-written subdrive 312 whenever the logical addresses 302 that are not written are recycled.

Figure 6:
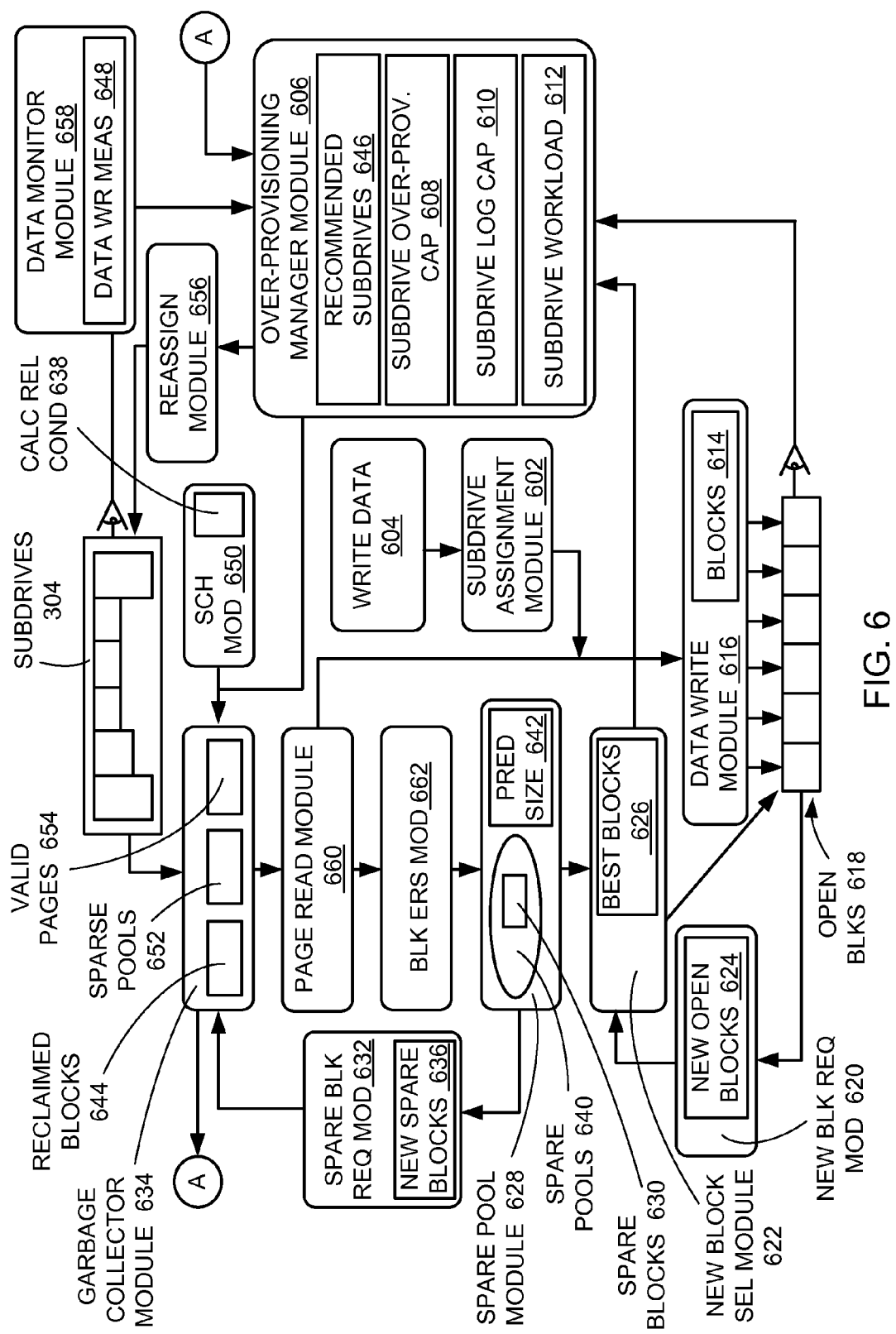
FIG. 6 is a control flow of the memory controller of FIG. 1.

Referring now to FIG. 6, therein is shown a control flow of the memory controller 104 of FIG. 1. The control flow depicts a block diagram showing an overall architecture of garbage collection, recycling, and wear leveling systems. The control flow depicts how the logical addresses 302 of FIGS. 3-5 are assigned to the subdrives 304 based on exemplary state diagrams of FIGS. 3-5. The overall architecture provides write amplification, garbage collection, and data integrity for the solid-state disk drive (SSD). The term "data integrity" is defined as absence of unintended changes or errors in data such that the data has not been corrupted in a process of being written to or read back from a memory device or during transmission via communication channels.

For workloads provided to the solid-state disk drive (SSD), some portions of a logical address space get more of the data write accesses 306 of FIGS. 3-5 than other portions of the logical address space. Some of the portions or regions that get a greater proportion of the data write accesses 306 are considered "hot". Some of the portions or regions that get disproportionately few of the data write accesses 306 are considered "cold". Address ranges of the logical address space that get none of the data write accesses 306 are considered as static.

Data of similar temperatures can be organized into a partition or one of the subdrives 304. The subdrives 304 can be organized from hottest to coldest. Data in the more-written subdrive 308 of FIGS. 3-5 can more likely be rewritten by the host system 108 of FIG. 1 compared to data in the less-written subdrive 312 of FIGS. 3-5. As an example, there can be any number of the subdrives 304 in the solid-state disk drive (SSD). As a specific example, there can be approximately six of the subdrives 304 in the solid-state disk drive (SSD).

The write amplification can be controlled for each partition of data or each of the subdrives 304 separately. Since hot data is written more often than cold data, it benefits the solid-state disk drive (SSD) to minimize its write amplification by providing extra physical memory for logical contents of the most-written subdrive 310 of FIGS. 3-5. Conversely, since cold data is not written very often compared to the hot data, the storage control system 100 of FIG. 1 can tolerate relatively high write amplification for the less-written subdrive 312. In a subsequent section of the specification, an outline of how to calculate an amount of over-provisioning to assign to each of the subdrives 304 is described with the objective of minimizing the overall write amplification of the solid-state disk drive (SSD).

The memory controller 104 can include a subdrive assignment module 602 to determine the subdrives 304 to assign the logical addresses 302 of FIGS. 3-5. As write data 604 need to be written, a decision can be made by the subdrive assignment module 602 as to whether the logical addresses 302 belong to one of the subdrives 304. The write data 604 are defined as data to be written to a storage device. For example, the write data 604 can represent data from the host system 108 arrives at the solid-state disk drive (SSD) or the memory sub-system 102 of FIG. 1 or data from one of the subdrives 304 to be written to the one of the subdrives 304 or another of the subdrives 304.

The logical addresses 302 can represent specific locations or space associated with the memory array 106 of FIG. 1 to which the write data 604 are to be written. The logical addresses 302 can be partitioned into a number of or assigned to any one of the subdrives 304.

For example, the logical addresses 302 can be partitioned into or assigned to the more-written subdrive 308 when the write data 604 is written to the logical addresses 302 in FIG. 3 or FIG. 5. Also for example, the logical addresses 302 can be partitioned into or assigned to the most-written subdrive 310 when the write data 604 is written to the logical addresses 302 in FIG. 4. Further, for example, the logical addresses 302 can be partitioned into or assigned to the less-written subdrive 312 when the logical addresses 302 that are not written with the write data 604 are recycled in FIGS. 3-5.

An assignment of the logical addresses 302 to the subdrives 304 can be done passively and not through a sophisticated assignment scheme. Management of the assignment of the logical addresses 302 to the subdrives 304 can be implemented as described in FIGS. 3-5. The assignment of the logical addresses 302 to the subdrives 304 can be done passively based on whether the logical addresses 302 are written by the host system 108 or recycled.

The subdrive assignment module 602 can assign the logical addresses 302 to the subdrives 304 as described in FIGS. 3-5. The logical addresses 302 can be assigned by moving the logical addresses 302 to the more-written subdrive 308 for the data write accesses 306 or moving the logical addresses 302 to the less-written subdrive 312 when the logical addresses 302 are recycled.

The memory controller 104 can include an over-provisioning manager module 606 to manage the write amplification (WA) for the storage control system 100. The write amplification can be managed for the solid-state disk drive (SSD). The write amplification can be managed by determining amounts of physical memory for the subdrives 304 shown in FIGS. 3-5. The amounts of physical memory assigned to the subdrives 304 can be computed or varied based on workloads associated with the subdrives 304.

An optimal amount of a physical capacity or memory assigned to each of the subdrives 304 can be computed. For example, the physical capacity or memory can be computed based on Lagrange multipliers. Equation 1 below shows an optimal formula to determine the optimal amount of the physical capacity.

$$\theta_i = \sqrt{\frac{\alpha_i \cdot v_i}{\left(\Sigma \sqrt{\alpha_i \cdot v_i}\right)^2}} \quad \text{(Eq. 1)}$$

The over-provisioning manager module 606 can use equation 1 to calculate a subdrive over-provisioning capacity 608 based on a subdrive logical capacity 610 and a subdrive workload 612. The subdrive logical capacity 610 and the subdrive workload 612 can be associated with any of the subdrives 304. For example, the subdrive over-provisioning capacity 608 can be calculated for the more-written subdrive 308 of FIGS. 3-5 or the most-written subdrive 310 of FIGS. 3-5. Also for example, the subdrive logical capacity 610 and the subdrive workload 612 can be associated with the more-written subdrive 308 or the most-written subdrive 310.

The subdrive over-provisioning capacity 608, denoted as "$\theta_i$," or theta(i), is defined as a fraction of the total over-provisioning assigned to one of the subdrives 304, denoted as subdrive i, where 'i' denotes a specific number for the one of the subdrives 304. The total over-provisioning is a total amount of storage space in a non-volatile memory that is allocated as an excess memory beyond a logical space or a capacity of the drive.

The subdrive logical capacity 610, denoted as "$\alpha_i$," or alpha (i), is defined as a fraction of the total logical address space assigned to one of the subdrives 304. The total logical address space is a total amount of storage space in a non-volatile memory that is allocated for writing the write data 604.

The subdrive workload 612, denoted as "$v_i$," or nu(i), is defined as a fraction of the total write workload associated with the subdrive i. The total write workload is a total number of host writes. The subdrive workload 612 of the subdrive i can be determined based on a number of host writes that arrive to the subdrive i to replace data currently residing in the subdrive i rather than to one of the subdrives 304, in which the write data 604 ultimately gets written to.

By periodically computing the amount of over-provisioning, the over-provisioning manager module 606 in the solid-state disk drive (SSD) can determine whether to shift blocks 614 from one of the subdrives 304 to another of the subdrives 304. The blocks 614 are defined as units of a non-volatile memory device or other types of block oriented non-volatile memory devices. The blocks 614 can be in the memory devices 110 of FIG. 1. For example, the blocks 614 can represent erase blocks or superblocks having a number of erase blocks.

A simplified version of Equation 1 is shown below in Equation 2. Equation 2 shows a slightly sub-optimal formula that is much less computationally intensive compared to Equation 1:

$$\theta_i = \frac{\alpha_i + v_i}{\Sigma_j \alpha_j + v_j} \quad \text{(Eq. 2)}$$

Since Equation 2 yields very similar performance to Equation 1 and is much simpler to implement, Equation 2 is a preferred formula for determining a fraction of the physical memory to dedicate or assign to each of the subdrives 304. The denominator in Equation 2 can be equal to 2. The subdrive over-provisioning capacity 608 can be calculated or estimated based on a sum of the subdrive logical capacity 610 and the subdrive workload 612. The subdrive over-provisioning capacity 608 can be estimated by calculating a quotient of the sum and a summation of sums of the subdrive logical capacity 610 and the subdrive workload 612 for all of the subdrives 304.

FIG. 6 depicts how calculation of the over-provisioning determined by the over-provisioning manager module 606 fits into the bigger picture of garbage collection, recycling, and wear leveling. The write data 604 for the data write accesses 306 arrived at the solid-state disk drive (SSD) or the memory sub-system 102, as depicted in the middle of FIG. 6, can be assigned and written to one of the subdrives 304 according to the exemplary state diagrams of FIGS. 3-5. For example, for the solid-state disk drive (SSD) or the memory sub-system 102 using the first exemplary state diagram in FIG. 3, the host system 108 can rewrite one of the logical addresses 302 in the subdrive 3 and a new copy of the one of the logical addresses 302 can be moved to the subdrive 2.

The memory controller 104 can include a data write module 616 to store the write data 604 to the blocks 614. The data write module 616 can write the write data 604 to a number of open blocks 618, which are defined the blocks 614 that are not completely written and thus available for writing. The open blocks 618 can be in the subdrives 304 assigned by the subdrive assignment module 602. The write data 604 can be written to the open blocks 618 at the logical addresses 302 assigned to the subdrives 304.

The memory controller 104 can include a new block request module 620 to request a new block selection module 622 in the memory controller 104 to determine new open blocks 624, which are defined units of a non-volatile memory device that will be written. After the data write module 616 fills or writes the open blocks 618, the data write module 616 notifies the new block request module 620 to request for the new open blocks 624.

The new block selection module 622 determines and provides best blocks 626 for the new open blocks 624 in the subdrives 304. The best blocks 626 are defined as storage units of a non-volatile memory device that are determined based on wear leveling of the subdrives 304. The new block selection module 622 can interface with a spare pool module 628 in the memory controller 104 to request for spare blocks 630 to select the best blocks 626 for the new open blocks 624. The spare blocks 630 are defined as units of a non-volatile memory device that will be available for storing data.

Since temperatures of the subdrives 304 largely determines how quickly the open blocks 618 will be filled, the new block selection module 622 can determine the best blocks 626 based on the wear leveling. The best blocks 626 determined based on the wear leveling can be mostly accomplished by selecting the spare blocks 630. The spare blocks 630 selected can include those that are lagging in program/erase (PE) cycles compared to the spare blocks 630 to be assigned as the open blocks 618 for the more-written subdrive 308 or those that have a relative excess of PE cycles to be assigned as the open blocks 618 for the less-written subdrive 312.

The new block selection module 622 can assign the blocks 614 selected as the new open blocks 624 to the subdrives 304. The new block selection module 622 can report the assignment of the new open blocks 624 to the over-provisioning manager module 606.

So long as a write workload of the host system 108 involves a mixture of hot and cold data, this approach can be used to achieve the wear leveling. However, if the write workload from the host system 108 is uniform across the logical address space, the proposed scheme can only provide equal wear leveling across a physical memory space.

The memory controller 104 can include a spare block request module 632 to request a garbage collector module 634 in the memory controller 104 to initiate a process to determine new spare blocks 636 for the spare pool module 628. In order to be able to apply additional write cycles to the spare blocks 630 with greater life expectancy, the spare block request module 632 can include a feature to instruct or request the garbage collector module 634 to select the blocks 614 from the subdrives 304 with intent of achieving smart wear leveling.

The term "smart wear leveling" refers to a method that reduces premature wear in a non-volatile memory device based on calculated reliability conditions 638 of the non-volatile memory including remaining life, read disturbs, data retention, or a combination thereof. The smart wear leveling can be achieved in addition to or rather than strictly minimizing the write amplification (WA) of the storage control system 100.

If in providing the spare blocks 630 to be selected for the open blocks 618 for the subdrives 304, each of spare pools 640 having the spare blocks 630 in the spare pool module 628 can drop below a predetermined size 642. The new block selection module 622 can select the best blocks 626 from the spare pools 640. For example, the best blocks 626 can be selected from the spare pools 640 when the open blocks 618 are filled or written in the most-written subdrive 310 in FIGS. 3-5.

The spare pools 640 are defined as collections or groups of the spare blocks 630. The predetermined size 642 is defined as a numerical value of a number of the spare blocks 630 in each of the spare pools 640. The predetermined size 642 is used to determine a level below which a request can be made from the spare pool module 628 to subsequently trigger the garbage collector module 634 to initiate the process to determine the new spare blocks 636 for the spare pools 640.

The garbage collector module 634 selects reclaimed blocks 644, which are defined as the next blocks to be subsequently recycled and made available for the spare pools 640. The garbage collector module 634 can select the reclaimed blocks 644 when the open blocks 618 in the subdrives 304 are filled or written. The garbage collector module 634 can select the reclaimed blocks 644 by taking inputs from or advice of the over-provisioning manager module 606 in the memory controller 104. The reclaimed blocks 644 can be selected by the garbage collector module 634 selecting the blocks 614 to harvest or take from the subdrives 304.

Within recommended subdrives 646 identified by the over-provisioning manager module 606, the garbage collector module 634 can attempt to select the blocks 614 with the most number of obsolete pages, for during recycling, a fewest number of re-writes of valid data is preferred, optimal, and most efficient but not needed. The memory controller 104 can use approximations to determine a number of the re-writes rather than determining a precise value of the fewest number of the re-writes. By following recommendations of the over-provisioning manager module 606, the write amplification (WA) can be minimized.

The subdrive workload 612 for one of the subdrives 304 can be calculated or estimated by the over-provisioning manager module 606 monitoring a number of the data write accesses 306 to the one of the subdrives 304. For example, the subdrive workload 612 for one of the recommended subdrives 646 can be estimated by monitoring a number of the data write accesses 306 to the one of the recommended subdrives 646.

The over-provisioning manager module 606 can identify the recommended subdrives 646 to the garbage collector module 634 by determining an ideal fraction of over-provisioning there should be for each of the subdrives 304 and by then comparing a desired number of the ideal fraction to an actual over-provisioning value. The subdrives 304 with the largest amount of excess over-provisioning compared to a target over-provisioning (OP) fraction, given in Equation 1 or Equation 2, can become the recommended subdrives 646 identified by the over-provisioning manager module 606 and recommended to the garbage collector module 634.

The over-provisioning manager module 606 can identify the subdrives 304 that have an excessive over-provisioning or too little over-provisioning. The over-provisioning manager module 606 can recalculate sizes of the subdrives 304 based on a flow of data into or out of each of the subdrives 304 and data write measures 648 of the subdrives 304. An objective of the over-provisioning manager module 606 is to minimize the write amplification (WA) based on Equation 1 or Equation 2. The data write measures 648 are defined as proportions of the data write accesses 306 over the total number of data accesses. For example, the data write measures 648 can represent data temperatures of the subdrives 304.

The memory controller 104 can include a scheduler module 650 to determine and provide the calculated reliability conditions 638 of the memory devices 110. For example, the scheduler module 650 can represent a solid-state disk drive (SSD) scheduler. The calculated reliability conditions 638 can include remaining life, read disturbs, data retention, or a combination thereof of the blocks 614 in the memory devices 110.

Sometimes, however, in order to preserve data integrity, specific instances of the blocks 614 for garbage collection that are becoming unreliable from excessive retention time or excessive read disturbs can be identified. In these cases, the scheduler module 650 can inform the garbage collector module 634 about the blocks 614 when the calculated reliability conditions 638 reach a specific threshold. For example, when remaining life, read disturbs, or data retention of the blocks 614 is above the specific threshold, the scheduler module 650 can inform the garbage collector module 634 so that the garbage collector module 634 can select the blocks 614 to reclaim.

The garbage collector module 634 can select the blocks 614 based on data integrity risk over the recommendations of the over-provisioning manager module 606. The data integrity risk can be determined based on the calculated reliability conditions 638 of the non-volatile memory.

The garbage collector module 634 can include a capability to override an optimal subdrive to do data-integrity recycling. The scheduler module 650 can include the capability by negotiating a rate at which the blocks 614 with data integrity are selected over the recommendations of the over-provisioning manager module 606. The scheduler module 650 can communicate with the garbage collector module 634 to negotiate the rate. As mentioned above, the recommendations of the over-provisioning manager module 606 can be overridden in the garbage collector module 634 if certain instances of the blocks 614 need to gain more PE cycles to maintain a uniform wear leveling or the smart wear leveling.

In order for the over-provisioning manager module 606 to calculate the subdrive over-provisioning capacity 608 as the ideal fraction of over-provisioning for each of the subdrives 304, the over-provisioning manager module 606 can estimate the subdrive workload 612 and the subdrive logical capacity 610 of each of the subdrives 304. The over-provisioning manager module 606 can estimate the subdrive workload 612 for each of the subdrives 304.

Estimation of the subdrive workload 612 to each of the subdrives 304 can be determined for the subdrives 304 in FIGS. 3-5. For example, for the second exemplary state diagram of FIG. 4, all of the write data 604 can be written to the subdrive 0. As a result, it would appear that none of the host workload could go to any other subdrive.

To solve this problem, the subdrive workload 612 per each of the subdrives 304 can be estimated by monitoring a number of host writes from the host system 108 that replace data in the each of the subdrives 304. Therefore, for example, if the write data 604 arrives at the memory array 106 to replace data currently residing in one of the subdrives 304, denoted as subdrive K, then the subdrive workload 612 of subdrive K can be considered as an incremental workload. The subdrive workload 612 can be considered as the incremental workload happened or originally intended to subdrive K rather than as a workload to subdrive K to which the write data 604 ultimately is written.

An actual workload estimate for the subdrive workload 612 for each of the subdrives 304 can be computed. The actual workload estimate can be computed by accumulating a number of times the each of the subdrives 304 is written, as previously described above, and dividing by a total number of the write data 604 is written to the each of the subdrives 304. In practice, computation of the actual workload estimate can be performed periodically. For example, the computation can be performed every 512 megabyte (MB) of data.

An infrequent update of "$v_i$" (or nu(i)) and "$\alpha_i$" (or alpha (i)) in Equation 2 can minimize a background workload on an internal processor of the solid-state disk drive (SSD). The infrequent update refers to relative reduction of update of values of the "$v_i$" (or nu(i)) and "$\alpha_i$" (or alpha(i)) in Equation 2 compared to values of the "$v_i$" (or nu(i)) and "$\alpha_i$" (or alpha(i)) in Equation 1.

The garbage collector module 634 can select the reclaimed blocks 644 by the blocks 614 with the fewest valid pages among the blocks 614 in the recommended subdrives 646 identified by the over-provisioning manager module 606. The recommended subdrives 646 can be identified based on the data write measures 648 by the over-provisioning manager module 606 selecting the blocks 614 in the recommended subdrives 646 with the fewest valid pages among the blocks 614. As shown with a connector labeled "A", the garbage collector module 634 can inform a subdrive manager or the over-provisioning manager module 606 which of the blocks 614 was reclaimed as the reclaimed blocks 644.

The garbage collector module 634 can select the reclaimed blocks 644 based on a number of valid pages 654 in the recommended subdrives 646. A superior or preferred approach can be used in the garbage collector module 634 to organize the blocks 614 of each of the subdrives 304 into sparse pools 652 that coarsely sort a number of the valid pages 654 per each of the blocks 614 in the recommended subdrives 646.

The sparse pools 652 are defined as groups of the blocks 614 that are organized or collected together based on the valid pages 654 of each of the blocks 614. The sparse pools 652 can be dynamically sized for efficiency by organizing the sparse pools 652 as a number of the valid pages 654 per each of the blocks 614 in the recommended subdrives 646 is updated. For example, the sparse pools 652 can represent bins of the blocks 614. The valid pages 654 are defined as portions of a non-volatile memory that include the write data 604.

For example, there can be any number of the sparse pools 652. Also for example, each of the sparse pools 652 can include the blocks 614 having an approximate range of percentages of the valid pages 654. As a specific example, if there are five of the sparse pools 652, the sparse pools 652 in one of the subdrives 304 can be organized or collected as groups with 0%-50%, 50%-60%, 60%-70%, 70%-80%, and 80%-100% of the valid pages 654.

Then, as contents of the blocks 614 are updated, numbers of obsolete pages for the blocks 614 that are old and the blocks 614 that are newly written can be updated. Upon updating these numbers, comparisons can be done to determine if the blocks 614 are still in a correct coarse list of the sparse pools 652. By limiting each of the subdrives 304 to a small number of the sparse pools 652, preferably twelve or less, background processing is significantly reduced allowing nearly optimal performance with greatly reduced processor workload.

A further improvement to the coarse list sorting is to optimize boundaries and sizes of each of the sparse pools 652. For example, the write amplification (WA) of the subdrive 0 can be below 2.5. As a result, it is important to have better resolution for the blocks 614 with fewer than 60% of the valid pages 654. Similarly, the least-written subdrive 314 of FIGS. 3-5 can have the write amplification (WA) that can exceed 2.5. Thus, it is better to have finer resolution between the sparse pools 652 with more than 60% of the valid pages 654.

For example, for the subdrive 0, ranges that determine fractions of the valid pages 654 for the sparse pools 652 can be {(0%-15%), (15%-25%), (25%-40%), (40%-60%) and (60-100%)}. In this example, for the least-written subdrive 314, ranges that determine fractions of the valid pages 654 for the sparse pools 652 can be {(0%-50%), (50%-65%), (65%-75%), (75%-85%), and (85%-100%)}. By defining the ranges in this fashion, the coarse list provides a better approximation of a full-sorted list but with benefits of reduced computations.

The over-provisioning manager module 606 can include is an initialization process at power up of the solid-state disk drive (SSD) or the memory controller 104. It is not important to preserve states of the subdrives 304 on power down because at power up the initialization process can reconstitute or reconstruct the states in any arbitrary way that nominally allots 1/N of logical data and physical space allocated to each of N of the subdrives 304. The logical data can represent the write data 604. When exposed to the data write accesses 306 of the host system 108, the memory controller 104 in the storage control system 100 can quickly adapt to an appropriate configuration of the subdrive logical capacity 610 and the subdrive over-provisioning capacity 608 for each of the subdrives 304.

The memory controller 104 can include a reassignment module 656 to reassign the blocks 614 to alternate or different instances of the subdrives 304. The reassignment module 656 can be used to improve system performance by allowing the blocks 614 to be reassigned to different instances of the subdrives 304 without performing the data write accesses 306 or block erasure to the blocks 614. When contents of the blocks 614 become static, a number of the obsolete pages in the blocks 614 does not change, and the blocks 614 can naturally stay or remain in its current subdrive. Rather than leaving the blocks 614 in a warm subdrive or the more-written subdrive 308, the blocks 614 can be reassigned to the less-written subdrive 312, thus avoiding processes of rewriting pages and erasing original blocks. This reduces an overall wear on the subdrives 304 and thus the solid-state disk drive (SSD).

For illustrative purposes, the memory controller 104 is shown with the subdrives 304 outside of the modules in the memory controller 104, although it is understood that the memory controller 104 can be implemented in a number of different manners. For example, the subdrives 304 can be controlled and maintained by the reassignment module 656.

The memory controller 104 can include a data monitor module 658 to monitor the data write measures 648 of the subdrives 304. The data monitor module 658 can monitor each of the data write measures 648 by calculating a number of the data write accesses 306 to each of the subdrives 304. The data monitor module 658 can provide the data write measures 648 to the over-provisioning manager module 606 to recalculate the sizes of the subdrives 304. The data monitor module 658 can monitor the data write measures 648 of the more-written subdrive 308 or the most-written subdrive 310 as the logical addresses 302 assigned to the more-written subdrive 308 or the most-written subdrive 310, respectively, are written with the write data 604.

The memory controller 104 can include a page read module 660 to read pages of the reclaimed blocks 644 and assign the reclaimed blocks 644 to the subdrives 304. The subdrives 304 that are assigned with the reclaimed blocks 644 can be determined based on how the logical addresses 302 migrate among the subdrives 304 as described in FIGS. 3-5. The subdrives 304 that are assigned with the reclaimed blocks 644 can depend upon whether the logical addresses 302 are written by the host system 108 or recycled.

The memory controller 104 can include a block erasure module 662 to erase the blocks 614 and put or assign the blocks 614 that have been erased in the spare pools 640 of the spare pool module 628. Upon completion of the erasure of the blocks 614, the block erasure module 662 can inform the spare pool module 628 that the blocks 614 are available to be used as the new spare blocks 636. The value of the block erasure module 662 is that the block erasure module 662 erases the blocks 614 in larger units than units that are written when using NAND flash for the memory devices 110, as examples. For example, only one page can be written at a time, but the smallest unit of erasing can be one of the blocks 614, which can include hundreds of pages.

The memory controller 104 or the solid-state drive (SSD) has been described above for moving data between the subdrives 304 in response to new host writes, although it is understood that the memory controller 104 or the SSD can have autonomy to move the data between the subdrives 304 in different manners. For example, the memory controller 104 can move the data for data-integrity purposes or using any subdrive-management technique. As a specific example, the memory controller 104 can include the garbage collector module 634 selecting the blocks 614 based on the calculated reliability conditions 638 as described above so that subsequently the write data 604 can be written to the open blocks 618 at the logical addresses 302 assigned to the subdrives 304.

The subdrive assignment module 602 can be implemented with the control unit 202 of FIG. 2, the storage unit 204 of FIG. 2, the memory interface unit 206 of FIG. 2, the host interface unit 208 of FIG. 2, or a combination thereof. For example, the subdrive assignment module 602 can be implemented with the control unit 202 to assign the logical addresses 302.

The over-provisioning manager module 606 can be implemented with the control unit 202, the storage unit 204, the memory interface unit 206, the host interface unit 208, or a combination thereof. For example, the over-provisioning manager module 606 can be implemented with the control unit 202 and the storage unit 204 to calculate the subdrive over-provisioning capacity 608, estimate the subdrive logical capacity 610, estimate the subdrive workload 612, and identify the recommended subdrives 646.

The data write module 616 can be coupled to or interfaced with the subdrive assignment module 602 and the over-provisioning manager module 606. The data write module 616 can be implemented with the control unit 202, the storage unit 204, the memory interface unit 206, the host interface unit 208, or a combination thereof. For example, the data write module 616 can be implemented with the control unit 202 and the storage unit 204 to write the write data 604 to a number of the open blocks 618 and notify the new block request module 620.

The new block request module 620 can be coupled to or interfaced with the data write module 616. The new block request module 620 can be implemented with the control unit 202, the storage unit 204, the memory interface unit 206, the host interface unit 208, or a combination thereof. For example, the new block request module 620 can be implemented with the control unit 202 to request the new block selection module 622.

The new block selection module 622 can be coupled to or interfaced with the over-provisioning manager module 606, the data write module 616, and the new block request module 620. The new block selection module 622 can be implemented with the control unit 202, the storage unit 204, the memory interface unit 206, the host interface unit 208, or a combination thereof. For example, the new block selection module 622 can be implemented with the control unit 202 and the storage unit 204 to determine the best blocks 626 and assign the blocks 614 selected as the new open blocks 624 to the subdrives 304.

The spare pool module 628 can be coupled to or interfaced with the new block selection module 622. The spare pool module 628 can be implemented with the control unit 202, the storage unit 204, the memory interface unit 206, the host interface unit 208, or a combination thereof. For example, the spare pool module 628 can be implemented with the control unit 202 and the storage unit 204 to store and provide the spare pools 640 with the spare blocks 630.

The spare block request module 632 can be coupled to or interfaced with the spare pool module 628. The spare block request module 632 can be implemented with the control unit 202, the storage unit 204, the memory interface unit 206, the host interface unit 208, or a combination thereof. For example, the spare block request module 632 can be implemented with the control unit 202 and the storage unit 204 to request the garbage collector module 634.

The garbage collector module 634 can be coupled to or interfaced with the subdrives 304, the over-provisioning manager module 606, and the spare block request module 632. The garbage collector module 634 can be implemented with the control unit 202, the storage unit 204, the memory interface unit 206, the host interface unit 208, or a combination thereof. For example, the garbage collector module 634 can be implemented with the control unit 202 and the storage unit 204 to select the reclaimed blocks 644.

The scheduler module 650 can be coupled to or interfaced with the garbage collector module 634. The scheduler module 650 can be implemented with the control unit 202, the storage unit 204, the memory interface unit 206, the host interface unit 208, or a combination thereof. For example, the scheduler module 650 can be implemented with the control unit 202 and the storage unit 204 to determine the calculated reliability conditions 638, inform the garbage collector module 634, and negotiate a rate at which the blocks 614 with data integrity are selected.

The reassignment module 656 can be coupled to or interfaced with the subdrives 304, the over-provisioning manager module 606, and the garbage collector module 634. The reassignment module 656 can be implemented with the control unit 202, the storage unit 204, the memory interface unit 206, the host interface unit 208, or a combination thereof. For example, the reassignment module 656 can be implemented with the control unit 202 and the storage unit 204 to reassign the blocks 614.

The data monitor module 658 can be coupled to or interfaced with the subdrives 304, the over-provisioning manager module 606, the garbage collector module 634, and the reassignment module 656. The data monitor module 658 can be implemented with the control unit 202, the storage unit 204, the memory interface unit 206, the host interface unit 208, or a combination thereof. For example, the data monitor module 658 can be implemented with the control unit 202 and the storage unit 204 to monitor the data write measures 648.

The page read module 660 can be coupled to or interfaced with the garbage collector module 634. The page read module 660 can be implemented with the control unit 202, the storage unit 204, the memory interface unit 206, the host interface unit 208, or a combination thereof. For example, the page read module 660 can be implemented with the control unit 202 and the storage unit 204 to read pages of the reclaimed blocks 644 and assign the reclaimed blocks 644.

The block erasure module 662 can be coupled to or interfaced with the page read module 660. The block erasure module 662 can be implemented with the control unit 202, the storage unit 204, the memory interface unit 206, the host interface unit 208, or a combination thereof. For example, the block erasure module 662 can be implemented with the control unit 202 and the storage unit 204 to erase the blocks 614 and put or assign the blocks 614 that have been erased in the spare pools 640.

It has been discovered that the subdrive assignment module 602 assigning the logical addresses 302 to the more-written subdrive 308 for the data write accesses 306 or moving the logical addresses 302 to the less-written subdrive 312 when the logical addresses 302 are recycled provides improved performance. The improved performance is provided by simply determining whether the logical addresses 302 are written by the host system 108 or recycled and thus not through a sophisticated assignment scheme that takes more processing time.

It has also been discovered that the data monitor module 658 monitoring the data write measures 648 in the subdrives 304 provides improved reliability since the data write measures 648 are used to reduce the write amplification in the subdrives 304.

It has further been discovered that the over-provisioning manager module 606 provides improved reliability by identifying the recommended subdrives 646 based on the data write measures 648 to minimize the write amplification. Minimizing the write amplification is an over-arching objective of the over-provisioning manager module 606 achieved by controlling the write amplification for each partition of data or each of the subdrives 304 separately.

It has further been discovered that the garbage collector module 634 provides improved reliability by selecting the reclaimed blocks 644 based on a number of the valid pages 654 in the recommended subdrives 646 for the new block selection module 622 to subsequently select the best blocks 626 for wear leveling purposes.

It has further been discovered that the new block selection module 622 selecting the best blocks 626 provides improved reliability since the best blocks 626 are determined for wear leveling. The best blocks 626 are determined based on the spare blocks 630 from the spare pools 640 that are lagging in program/erase (PE) cycles for the more-written subdrive 308 or based on the spare blocks 630 that have a relative excess of PE cycles for the less-written subdrive 312.

It has further been discovered that the over-provisioning manager module 606 provides an optimal amount of the physical capacity using equation 1 by calculating the subdrive over-provisioning capacity 608 based on the subdrive logical capacity 610 and the subdrive workload 612.

It has further been discovered that the over-provisioning manager module 606 provides improved performance by calculating the subdrive over-provisioning capacity 608 based on simply a sum of the subdrive logical capacity 610 and the subdrive workload 612.

It has further been discovered that the over-provisioning manager module 606 provides improved performance by estimating the subdrive workload 612 for the recommended subdrives 646 simply by monitoring a number of the data write accesses 306 to the recommended subdrives 646.

It has further been discovered that the infrequent update of the subdrive logical capacity 610 and the subdrive workload 612 in Equation 2 provides improved performance since the infrequent update minimizes the background workload on an internal processor of the solid-state disk drive (SSD).

It has further been discovered that limiting each of the subdrives 304 to a small number of the sparse pools 652, preferably twelve or less, provides improved performance since background processing is significantly reduced allowing nearly optimal performance with greatly reduced processor workload.

It has further been discovered that the reassignment module 656 provides improved system performance by allowing the blocks 614 to be reassigned to different instances of the subdrives 304 without performing the data write accesses 306 or block erasure to the blocks 614.

It has further been discovered that the over-provisioning manager module 606 having the initialization process provides improved reliability since the over-provisioning manager module 606 does not have to save the states of the subdrives 304 to the memory devices 110 on power down. Thus, access to the memory devices 110 is reserved for storing the write data 604 or critical information so that they are available upon the next power up cycle resulting in improved data availability and reliability.

Figure 7:
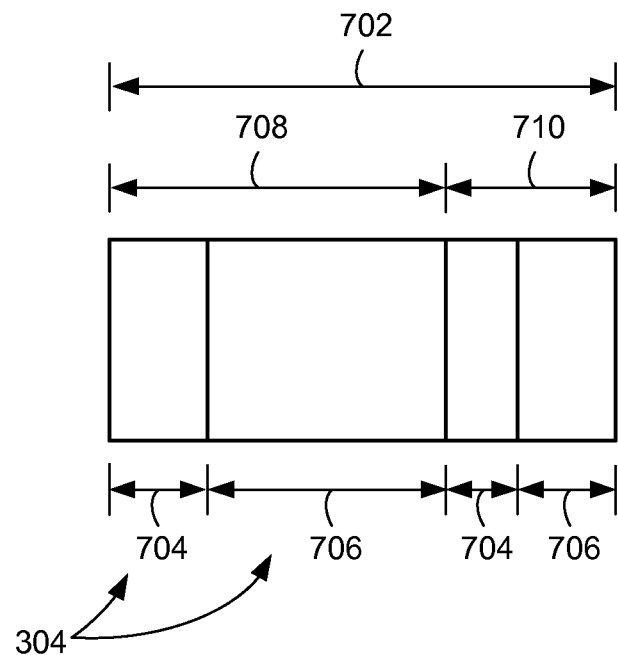
FIG. 7 is an example of an over-provisioning method.

Referring now to FIG. 7, therein is shown an example of an over-provisioning method. The example depicts the over-provisioning method that can be used in the over-provisioning manager module 606 of FIG. 6 for maintaining useable capacity of a storage device or the memory sub-system 102 of FIG. 1. For illustrative purposes, the example is shown with only two of the subdrives 304, although there can be any number of the subdrives 304.

The example can represent a technique for managing write amplification (WA) using the subdrives 304. The example depicts sizing differences between the subdrives 304 and their overprovisioning.

A physical capacity 702 of the memory sub-system 102 or the solid-state disk drive (SSD) can be assigned to a number of the subdrives 304. The physical capacity 702 is defined as the total amount of storage space in a non-volatile memory. For example, there can be two of the subdrives 304, denoted as a first subdrive 704 and a second subdrive 706. In this example, the physical capacity 702 can be assigned to the first subdrive 704 and the second subdrive 706. The physical capacity 702 can be partitioned into a total logical capacity 708 and a total over-provisioning capacity 710. The first subdrive 704 or the second subdrive 706 can represent any one of the subdrives 304 including the more-written subdrive 308 of FIG. 3, the most-written subdrive 310 of FIG. 3, the less-written subdrive 312 of FIG. 3, the least-written subdrive 314 of FIG. 3, or the intermediate subdrives 316 of FIG. 3.

The total logical capacity 708 is defined as a total amount of storage space in a non-volatile memory that is allocated for writing the write data 604 of FIG. 6. The total logical capacity 708 is less than the physical capacity 702. The total logical capacity 708 is the total logical address space previously described in FIG. 6.

The total over-provisioning capacity 710 is defined as a total amount of storage space in a non-volatile memory that is allocated as an excess memory beyond a logical space or a capacity of the drive. The total over-provisioning capacity 710 can be determined based on a difference of a physical capacity and a logical capacity of a drive. For example, a 200-gigabyte (GB) drive can refer to the drive with the logical capacity of 200 GB. The drive can have approximately 256 GB of the physical capacity. The total over-provisioning capacity 710 can be 56 GB, which is the difference of the physical capacity and the logical capacity of the drive. The total over-provisioning capacity 710 can represent a total storage space in the memory devices 110 of FIG. 1 allocated to the memory controller 104 of FIG. 1 for storing the write data 604 for purposes of the write amplification (WA) as determined by the memory controller 104. The total over-provisioning capacity 710 is the total over-provisioning previously described in FIG. 6.

The first subdrive 704 can be allocated with a portion of the total logical capacity 708 and the second subdrive 706 can be allocated with another or remaining portion of the total logical capacity 708. A portion of the total logical capacity 708 allocated to the first subdrive 704 can be less than a portion of the total logical capacity 708 allocated to the second subdrive 706. A portion of the total over-provisioning capacity 710 allocated for the first subdrive 704 or the second subdrive 706 can be the subdrive logical capacity 610 of FIG. 6.

The first subdrive 704 can be allocated with a portion of the total over-provisioning capacity 710 and the second subdrive 706 can be allocated with another or remaining portion of the total over-provisioning capacity 710. A portion of the total over-provisioning capacity 710 allocated to the first subdrive 704 can be less than a portion of the total over-provisioning capacity 710 allocated to the second subdrive 706. A portion of the total over-provisioning capacity 710 allocated for the first subdrive 704 or the second subdrive 706 can be determined by calculating the subdrive over-provisioning capacity 608 of FIG. 6.

For illustrative purposes, a portion of the total over-provisioning capacity 710 allocated to the first subdrive 704 is shown as less than another portion of the total over-provisioning capacity 710 allocated to the second subdrive 706, although it is understood that any portions of the total over-provisioning capacity 710 can allocated to the first subdrive 704 and the second subdrive 706. For example, a portion of the total over-provisioning capacity 710 allocated to the first subdrive 704 can be more than or equal to another portion of the total over-provisioning capacity 710 allocated to the second subdrive 706.

The total over-provisioning capacity 710 can be used to compensate for loss in the total logical capacity 708 due to defects or failures. The total over-provisioning capacity 710 can include a number of the spare blocks 630 of FIG. 6.

Figure 8:
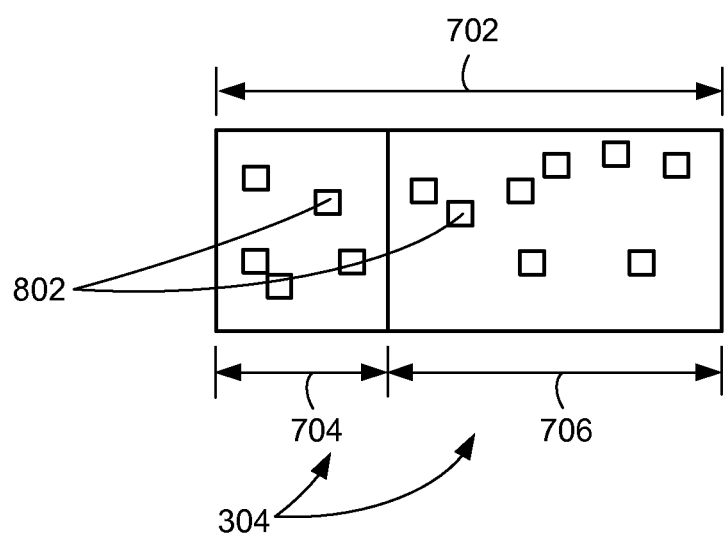
FIG. 8 is an example of another over-provisioning method.

Referring now to FIG. 8, therein is shown an example of another over-provisioning method. The example depicts the another over-provisioning method that can be used in the over-provisioning manager module 606 of FIG. 6 for maintaining useable capacity of a storage device or the memory sub-system 102 of FIG. 1. For illustrative purposes, the example is shown with only two of the subdrives 304, although there can be any number of the subdrives 304.

The example can represent another technique for managing write amplification (WA) using the subdrives 304. The example can represent a different technique compared to a technique described in FIG. 7. The example depicts how overprovisioning in one of the subdrives 304 is dispersed across the blocks 614 of FIG. 6 in the one of the subdrives 304.

The physical capacity 702 of the memory sub-system 102 or the solid-state disk drive (SSD) can be assigned to the subdrives 304. For example, there can be two of the subdrives 304, denoted as the first subdrive 704 and the second subdrive 706. In this example, the physical capacity 702 can be assigned to the first subdrive 704 and the second subdrive 706.

The physical capacity 702 can be partitioned among the first subdrive 704 and the second subdrive 706. There can be invalid blocks 802 of data in the first subdrive 704 and the second subdrive 706. The invalid blocks 802 are defined as units of a non-volatile memory that do not hold valid data. The invalid blocks 802 can be erased before they can be written again. The invalid blocks 802 can be marked by the over-provisioning manager module 606 and avoided from being written by the memory controller 104 of FIG. 1.

Figure 9:
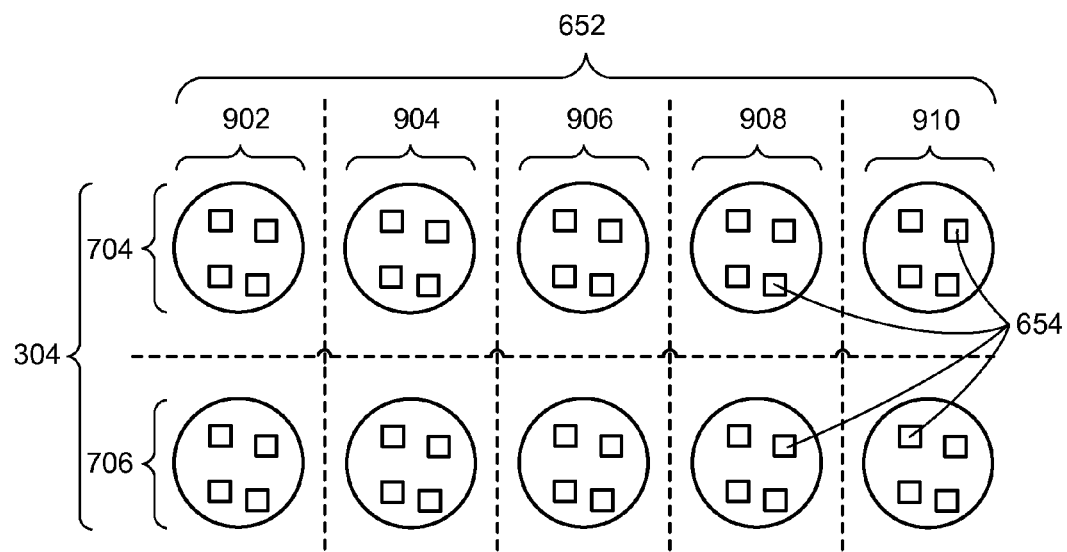
FIG. 9 is an example of the sparse pools.

Referring now to FIG. 9, therein is shown an example of the sparse pools 652. The example includes a set of the sparse pools 652 for two of the subdrives 304. The sparse pools 652 can be graded or organized by the garbage collector module 634 of FIG. 6. The sparse pools 652 can be graded based on a number of the valid pages 654 per each of the blocks 614 of FIG. 6 in the recommended subdrives 646 of FIG. 6.

For illustrative purposes, the example is shown with five of the sparse pools 652, although it is understood that there can be any number of the sparse pools 652. Also for illustrative purposes, the example is shown with only two of the subdrives 304, although there can be any number of the subdrives 304. The example depicts two of the subdrives 304, denoted as the first subdrive 704 and the second subdrive 706.

For example, the first subdrive 704 and the second subdrive 706 can have five of the sparse pools 652 graded based on the write amplification (WA) of the subdrives 304. In this example, five of the sparse pools 652 are denoted as a first sparse pool 902, a second sparse pool 904, a third sparse pool 906, a fourth sparse pool 908, and a fifth sparse pool 910.

Partitioning of the valid pages 654 for each of the sparse pools 652 can be performed in any manner. As an example, percentages of a total of the valid pages 654 for each of the sparse pools 652 can be distributed evenly with 20% of the total of the valid pages 654 in each of the first sparse pool 902, the second sparse pool 904, the third sparse pool 906, the fourth sparse pool 908, and the fifth sparse pool 910.

As another example, for the most-written subdrive 310 of FIGS. 3-5, percentages of the total of the valid pages 654 for the first sparse pool 902, the second sparse pool 904, the third sparse pool 906, the fourth sparse pool 908, and the fifth sparse pool 910 can be (0%-15%), (15%-25%), (25%-40%), (40%-60%) and (60-100%), respectively. As a further example, for the least-written subdrive 314 of FIGS. 3-5, percentages of the total of the valid pages 654 in the first sparse pool 902, the second sparse pool 904, the third sparse pool 906, the fourth sparse pool 908, and the fifth sparse pool 910 can be (0%-50%), (50%-65%), (65%-75%), (75%-85%), and (85%-100%), respectively.

Figure 10:
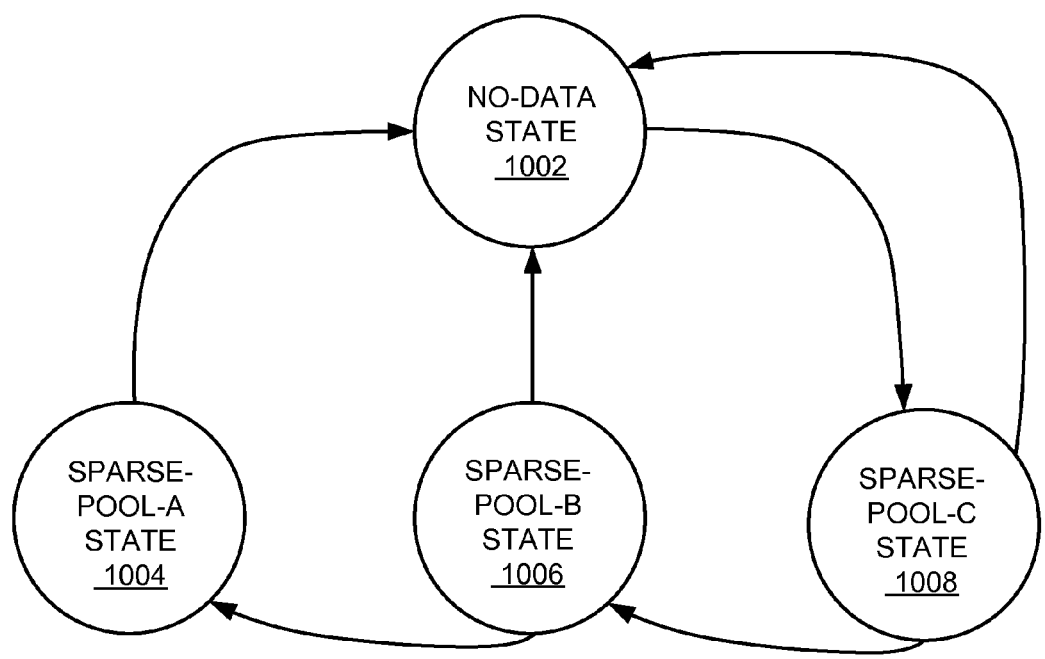
FIG. 10 is an exemplary state diagram of grading the spare pools of FIG. 6.

Referring now to FIG. 10, therein is shown an exemplary state diagram of grading the sparse pools 652 of FIG. 6. FIG. 10 depicts the exemplary state diagram of a state machine showing how the blocks 614 of FIG. 6 of data can be moved between different instances of the sparse pools 652 within one of the subdrives 304 of FIG. 3. The state diagram depicts how the sparse pools 652 are organized based on the valid pages 654 of FIG. 6 in the blocks 614 in the sparse pools 652.

The spare pool module 628 of FIG. 6 can provide a number of the valid pages 654 in each of the blocks 614 in the spare pools 640 of FIG. 6 to the garbage collector module 634 of FIG. 6. The valid pages 654 can be used to select the reclaimed blocks 644 of FIG. 6 by the blocks 614 with the fewest valid pages among the blocks 614 in the recommended subdrives 646 of FIG. 6. The spare pool module 628 can provide a list of the blocks 614 in each of the spare pools 640 to the garbage collector module 634 for the garbage collector module 634 to determine which of the spare pools 640 to select the blocks 614.

The exemplary state diagram can be implemented in the garbage collector module 634. For illustrative purposes, the exemplary state diagram depicts 3 states for 3 of the sparse pools 652, although it is understood that there can be any number of states for any number of the sparse pools 652. For example, 3 of the sparse pools 652 are denoted as a sparse pool A, a sparse pool B, and a sparse pool C.

The exemplary state diagram depicts states of the garbage collector module 634. The exemplary state diagram can include a no-data state 1002, a sparse-pool-a state 1004, a sparse-pool-b state 1006, and a sparse-pool-c state 1008. When there is no data, the garbage collector module 634 can be in the no-data state 1002.

When the blocks 614 are written with the write data 604 of FIG. 6, the blocks 614 can be allocated to one of the sparse pools 652. If there are 67%-100% of the total of the valid pages 654 in the blocks 614, the blocks 614 can be allocated to the sparse pool C and the garbage collector module 634 is in the sparse-pool-c state 1008.

If there are 33%-67% of the total of the valid pages 654 in the blocks 614 or a number of the valid pages 654 in the blocks 614 falls below 67%, the blocks 614 can be allocated to the sparse pool B and the garbage collector module 634 is in the sparse-pool-b state 1006. If there are 0%-33% of the total of the valid pages 654 in the blocks 614 or a number of the valid pages 654 in the blocks 614 falls below 33%, the blocks 614 can be allocated to the sparse pool A and the garbage collector module 634 is in the sparse-pool-a state 1004.

When the blocks 614 are erased, there is no data in the blocks 614 and the garbage collector module 634 is in the no-data state 1002. The states of the garbage collector module 634 can change from the sparse-pool-a state 1004, the sparse-pool-b state 1006, or the sparse-pool-c state 1008 to the no-data state 1002 when the blocks 614 are erased. The blocks 614 can be checked for data retention when the blocks 614 are in the sparse-pool-a state 1004, the sparse-pool-b state 1006, or the sparse-pool-c state 1008.

Figure 11:
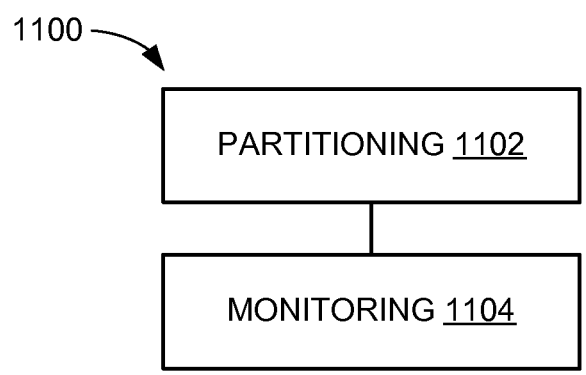
FIG. 11 is a flow chart of a method of operation of the storage control system in a further embodiment of the present invention.

Referring now to FIG. 11, therein is shown a flow chart of a method 1100 of operation of the storage control system 100 in a further embodiment of the present invention. The method 1100 includes: partitioning logical addresses into a number of subdrives, the logical addresses associated with a memory device in a block 1102; and monitoring a data write measure of one of the subdrives in a block 1104.

Thus, it has been discovered that the storage control system of the present invention furnishes important and heretofore unknown and unavailable solutions, capabilities, and functional aspects for a storage control system with write amplification control mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation in a non-volatile storage device, comprising:
assigning, to each subdrive of respective subdrives of the non-volatile storage device, respective logical addresses of a logical address space in accordance with a quantity of host writes to each of the respective logical addresses;
assigning to each subdrive of the respective subdrives a portion of a total over-provisioning capacity of the non-volatile storage device in accordance with a write workload of the subdrive, wherein the write workload of the subdrive is in accordance with a quantity of host writes to the subdrive; and
monitoring the quantity of host writes to each of the respective subdrives.

2. The method as claimed in claim 1 further comprising:
designating active states to each subdrive of the respective subdrives in accordance with the write workload of the subdrive, the designated active states corresponding to a range of subdrive write workloads; and
in conjunction with writing data to the non-volatile storage device by a host system, re-assigning one of the logical addresses from a subdrive with a designated state corresponding to a first subdrive workload to another subdrive with a designated state corresponding to a second subdrive workload higher than the first subdrive workload.

3. The method as claimed in claim 2 further comprising:
in conjunction with garbage collection, re-assigning one of the logical addresses from the subdrive with the designated state corresponding to the second subdrive workload to the subdrive with the designated state corresponding to the first subdrive workload.

4. The method as claimed in claim 1 further comprising:
determining current over-provisioning capacities and target over-provisioning capacities for one or more of the respective subdrives; and
re-assigning one or more blocks of the non-volatile storage device from one of the subdrives to another one of the subdrives in accordance with differences between the target over-provisioning capacities and the current over-provisioning capacities for the one or more of the respective subdrives.

5. The method as claimed in claim 4 further comprising:
identifying a subdrive for garbage collection in accordance with the differences between the target over-provisioning capacities and the current over-provisioning capacities for the respective subdrives.

6. The method as claimed in claim 1, further comprising:
calculating the portion of the total over-provisioning capacity to assign to each subdrive of the respective subdrives in accordance with the write workload of the subdrive and a subdrive logical capacity of the subdrive.

7. The method as claimed in claim 1, wherein the respective subdrives of the non-volatile storage device have a plurality of different sizes.

8. A method of operation of a storage control system comprising:
assigning, to each subdrive of a set of respective subdrives of a non-volatile storage device, respective logical addresses of a logical address space;
monitoring a data write measure of one of the subdrives; and
identifying a recommended subdrive based on the data write measure.

9. The method as claimed in claim 8 further comprising assigning one of the logical addresses towards a most-written subdrive when write data is written to the one of the logical addresses, the logical addresses are for writing by a host system.

10. The method as claimed in claim 8 further comprising assigning one of the logical addresses to a less-written subdrive when the one of the logical addresses is recycled.

11. The method as claimed in claim 8 further comprising calculating a subdrive over-provisioning capacity for one or more of the subdrives based on a subdrive logical capacity associated with the one of the subdrives.

12. The method as claimed in claim 8 further comprising organizing a block of the one of the subdrives into a sparse pool based on a number of valid pages of the block, the blocks selected based on a calculated reliability condition.

13. A non-volatile storage device, comprising:
a subdrive assignment module for assigning respective logical addresses of a logical address space to each subdrive of respective subdrives of the non-volatile storage device in accordance with a quantity of host writes to each of the respective logical addresses;
a data monitor module, coupled to the subdrive assignment module, for monitoring the quantity of host writes to each of the respective subdrives; and
an over-provisioning manager module, coupled to the data monitor module, for identifying a subdrive to recommend for garbage collection in accordance with a write workload of each subdrive of the respective subdrives.

14. The non-volatile storage device as claimed in claim 13, wherein the over-provisioning manager module is also for calculating subdrive over-provisioning capacities for one or more of the respective subdrives,
wherein the calculated subdrive over-provisioning capacities are in accordance with the write workload of each subdrive of the respective subdrives, and
wherein the write workload of each subdrive of the respective subdrives is in accordance with a quantity of host writes to the subdrive.

15. The non-volatile storage device as claimed in claim 14 wherein the over-provisioning manager module is for calculating the subdrive over-provisioning capacities for the one or more of the respective subdrives based on subdrive logical capacities associated with the respective subdrives.

16. The non-volatile storage device as claimed in claim 13, wherein the over-provisioning manager module is also for assigning to each subdrive of the respective subdrives a portion of a total over-provisioning capacity of the non-volatile storage device in accordance with the write workload of the subdrive, wherein the write workload of the subdrive is in accordance with a quantity of host writes to the subdrive.

17. The non-volatile storage device as claimed in claim 13 wherein the subdrive assignment module is also for:
designating active states to each subdrive of the respective subdrives in accordance with the write workload of the subdrive, the designated active states corresponding to a range of subdrive write workloads; and
in conjunction with writing data to the non-volatile storage device by a host system, re-assigning one of the logical addresses from a subdrive with a designated state corresponding to a first subdrive workload to another subdrive with a designated state corresponding to a second subdrive workload higher than the first subdrive workload.

18. The non-volatile storage device as claimed in claim 17 wherein the subdrive assignment module is for re-assigning one of the logical addresses from the subdrive with the designated state corresponding to the second subdrive workload to the subdrive with the designated state corresponding to the first subdrive workload in conjunction with garbage collection.

19. The non-volatile storage device as claimed in claim 13 wherein the over-provisioning manager module is further for:
   determining current over-provisioning capacities and target over-provisioning capacities for one or more of the subdrives; and
   re-assigning one or more blocks of the non-volatile storage device from one of the subdrives to another one of the subdrives in accordance with differences between the target over-provisioning capacities and the current over-provisioning capacities for the one or more of the subdrives.

20. The non-volatile storage device as claimed in claim 13, wherein the respective subdrives of the non-volatile storage device have a plurality of different sizes.

* * * * *